(12) United States Patent
Deckard et al.

(10) Patent No.: US 11,292,327 B2
(45) Date of Patent: Apr. 5, 2022

(54) SIDE-BY-SIDE ATV

(71) Applicant: Polaris Industries Inc., Medina, MN (US)

(72) Inventors: Aaron D. Deckard, Zionsville, IN (US); Jason C. Plugge, Mahtomedi, MN (US); Alan A. Meyer, Livermore, CA (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 16/866,296

(22) Filed: May 4, 2020

(65) Prior Publication Data

US 2020/0262285 A1 Aug. 20, 2020

Related U.S. Application Data

(63) Continuation of application No. 15/804,136, filed on Nov. 6, 2017, now Pat. No. 10,926,618, which is a continuation of application No. 14/094,747, filed on Dec. 2, 2013, now Pat. No. 9,809,102, which is a continuation of application No. 12/925,560, filed on Oct. 25, 2010, now Pat. No. 8,596,405, which is a continuation of application No. 11/494,891, filed on Jul. 28, 2006, now Pat. No. 7,819,220.

(51) Int. Cl.
| | |
|---|---|
| *B60K 5/00* | (2006.01) |
| *B62D 21/18* | (2006.01) |
| *B62K 21/00* | (2006.01) |
| *B62K 25/00* | (2006.01) |
| *B60K 17/348* | (2006.01) |
| *B60N 2/01* | (2006.01) |
| *B62M 27/02* | (2006.01) |

(52) U.S. Cl.
CPC .............. *B60K 5/00* (2013.01); *B60K 17/348* (2013.01); *B60N 2/01* (2013.01); *B62D 21/183* (2013.01); *B62K 21/00* (2013.01); *B62K 25/00* (2013.01); *B62M 27/02* (2013.01)

(58) Field of Classification Search
CPC ...... B60K 5/00; B60K 17/348; B60D 21/183; B62M 27/02
See application file for complete search history.

(56) References Cited

U.S. PATENT DOCUMENTS

| | | | |
|---|---|---|---|
| 3,407,893 A | 10/1968 | Hill et al. | |
| 4,217,970 A * | 8/1980 | Chika | B60G 21/055 180/298 |
| 4,340,123 A | 7/1982 | Fujikawa | |
| 4,425,976 A | 1/1984 | Kimura | |
| 4,505,169 A * | 3/1985 | Ganoung | B60W 30/18 477/100 |

(Continued)

OTHER PUBLICATIONS

Ex Parte Sunsdahl, Decision on Appeal in U.S. Appl. No. 14/478,689, filed May 22, 2020 (31 pages).

(Continued)

*Primary Examiner* — Karen Beck
(74) *Attorney, Agent, or Firm* — Faegre Drinker Biddle & Reath LLP

(57) ABSTRACT

The present invention relates to all terrain vehicles having at least a pair of laterally spaced apart seating surfaces. More particularly, the present invention relates to trail compliant side-by-side all terrain vehicles.

22 Claims, 27 Drawing Sheets

(56) References Cited

U.S. PATENT DOCUMENTS

| | | | |
|---|---|---|---|
| 4,641,854 A | 2/1987 | Masuda et al. | |
| 4,681,178 A | 7/1987 | Brown | |
| 4,773,675 A | 9/1988 | Kosuge | |
| 4,798,400 A | 1/1989 | Kosuge | |
| 4,817,985 A | 4/1989 | Enokimoto et al. | |
| 4,981,193 A | 1/1991 | Lings | |
| 5,251,713 A * | 10/1993 | Enokimoto | B60R 5/003 180/68.4 |
| 5,327,989 A * | 7/1994 | Furuhashi | B60G 3/20 180/248 |
| 5,950,748 A | 9/1999 | Matsumoto et al. | |
| 5,954,364 A * | 9/1999 | Nechushtan | B62D 23/005 280/781 |
| 5,961,135 A | 10/1999 | Smock | |
| 6,070,689 A | 6/2000 | Tanaka et al. | |
| 6,412,585 B1 | 7/2002 | DeAnda | |
| 6,622,806 B1 | 9/2003 | Matsuura | |
| 6,626,260 B2 | 9/2003 | Gagnon et al. | |
| 6,659,566 B2 | 12/2003 | Bombardier | |
| 6,722,463 B1 | 4/2004 | Reese | |
| D497,324 S | 10/2004 | Chestnut et al. | |
| 6,820,708 B2 | 11/2004 | Nakamura | |
| 7,040,437 B1 | 5/2006 | Fredrickson et al. | |
| D535,215 S * | 1/2007 | Turner | D12/87 |
| 7,159,557 B2 | 1/2007 | Yasuda et al. | |
| 7,168,516 B2 | 1/2007 | Nozaki et al. | |
| D549,133 S | 8/2007 | Lepage | |
| 7,347,490 B2 | 3/2008 | Kobayashi et al. | |
| 7,357,211 B2 * | 4/2008 | Inui | B62D 3/12 180/266 |
| 7,367,417 B2 | 5/2008 | Inui et al. | |
| 7,591,472 B2 * | 9/2009 | Kinjyo | B60G 21/055 267/188 |
| 7,708,103 B2 | 5/2010 | Okuyama et al. | |
| 7,708,106 B1 | 5/2010 | Bergman et al. | |
| 8,052,202 B2 | 11/2011 | Nakamura | |
| 2002/0023792 A1 | 2/2002 | Bouffard et al. | |
| 2004/0195019 A1 | 10/2004 | Kato et al. | |
| 2004/0195028 A1 | 10/2004 | Izumi | |
| 2004/0195034 A1 | 10/2004 | Kato et al. | |
| 2004/0195797 A1 | 10/2004 | Nash et al. | |
| 2004/0206567 A1 | 10/2004 | Kato et al. | |
| 2005/0056472 A1 | 3/2005 | Smith et al. | |
| 2005/0173177 A1 | 8/2005 | Smith et al. | |
| 2005/0173180 A1 * | 8/2005 | Hypes | F16H 48/30 180/292 |
| 2006/0032690 A1 | 2/2006 | Inomoto et al. | |
| 2007/0000715 A1 * | 1/2007 | Denney | G05G 1/405 180/311 |
| 2007/0023221 A1 * | 2/2007 | Okuyama | B60K 5/1216 180/240 |
| 2007/0023566 A1 | 2/2007 | Howard | |
| 2007/0227793 A1 | 10/2007 | Nozaki et al. | |
| 2020/0346542 A1 * | 11/2020 | Rasa | B62D 33/0207 |

OTHER PUBLICATIONS

Ex Parte Sunsdahl, Decision on Appeal in U.S. Appl. No. 14/478,700, filed Jun. 2, 2020 (23 pages).
"Hart's Hunter," Dirt Wheels Magazine, Dec. 1998; pp. 69-71 and 74; 4 pages.
Arctic Cat's Prior Art Statement, Jun. 1, 2015; Exhibit L Documents Cited; AC00016461—"Honda Pilot 2 Seater Prototype," 3 Wheeler World, http://www.3wheelerworld.com/showthread.php/71694-Honda-Pilot-2-Seater-Prototype; 2 pages.
Honda 89 FL400R Pilot Service Manual, Honda Motor co., Ltd., 1988, 265 pages.
"Tornado by Drakart," Drakart, http://web.archive.org/web/20060922104409/http://drakart.com/tornado.html, Sep. 22, 2006; 3 pages.
"Drakart Two Seater," Drakart, http://web.archive.org/web/20021204120435/http:/drakart.com/english/twoseat.htm, Dec. 4, 2002; 1 page.
"Drakart Extreme," Drakart, http://web.archive.org/web/20021227091813/http://www.drakart.com/english/extreme.html, Dec. 27, 2002; 3 pages.
Official Honda Shop Manual: FL350R Odyssey 350, Honda Motor Co., Ltd., 1985; 209 pages.
"Peugeot 205T16," Rally Giants, by Graham Robson, Aug. 15, 2007; 129 pages.
Arctic Cat's Prior Art Statement, Jun. 1, 2015; Exhibit L Documents Cited; AC00111412—"Revolt Service Manual," Redline Performance Products, LLC; (259 pages).
Arctic Cat's Prior Art Statement, Jun. 1, 2015; Exhibit L Documents Cited; AC00111700—"My New Revenge Silencer," Sandrail Forums, http://www.glamisdunes.com/invision/index.php?showtopic=; 66 pages.
"Sand Styling," Dune Buggies and Hot VWs, by Dean Kirsten, Oct. 2004; 5 pages.

* cited by examiner

SIDE-BY-SIDE ATV

CROSS-REFERENCE TO RELATED APPLICATIONS

The present application is a continuation of U.S. patent application Ser. No. 15/804,136, filed Nov. 6, 2017, which is a continuation of Ser. No. 14/094,747 filed Dec. 2, 2013, now U.S. Pat. No. 9,809,102 issued Nov. 7, 2017; which in turn is a continuation of Ser. No. 12/925,560 filed Oct. 25, 2010, now U.S. Pat. No. 8,596,405 issued Dec. 3, 2013; which in turn is a continuation of Ser. No. 11/494,891 filed Jul. 28, 2006, now U.S. Pat. No. 7,819,220 issued Oct. 26, 2010, the entirety of all such patents being incorporated herein by reference.

FIELD OF THE INVENTION

The present invention relates to side-by-side all terrain vehicles having at least a pair of laterally spaced apart seating surfaces. More particularly, the present invention relates to trail compliant side-by-side all terrain vehicles.

BACKGROUND OF THE INVENTION

Generally, all terrain vehicles ("ATVs") and utility vehicles ("UVs") are used to carry one or two passengers and a small amount of cargo over a variety of terrains. Due to increasing recreational interest in ATVs, specialty ATVs, such as those used for trail riding, racing, and cargo hauling have entered the market place. Most ATVs include seating for up to two passengers which are either seated side-by-side or with the passenger positioned behind the driver of the ATV. Side-by-side ATVs, in which the driver and passenger are seated beside each other on laterally spaced apart seats, have become popular because of the ability to allow the passenger to share the driver's viewpoint and riding experience instead of being positioned behind the driver. Due to the side-by-side seating arrangement, most side-by-side ATVs have a width of at least 54 inches (137 centimeters). Increasing numbers of ATV riders are enjoying recreational trail riding through public lands including state parks and national forests. Most trails on such public lands have a mandated maximum width requirement to limit damage to the environment. For example, most parks have established a maximum trail width of about 50 inches, making the use of most side-by-side ATVs on trails unacceptable or impractical.

SUMMARY OF THE INVENTION

According to an illustrative embodiment of the present disclosure, an all-terrain vehicle is shown which includes a frame, an engine supported by the frame, a transmission supported by the frame. A pair of front wheels, and a pair of rear wheels are operably coupled to the frame. A pair of laterally spaced-apart seating surfaces are supported by the frame. A pair of outermost lateral points of the vehicle define a vehicle width less than 54 inches.

According to a further illustrative embodiment of the present disclosure, an all-terrain vehicle is shown which includes a frame, an engine supported by the frame, and a transmission supported by the frame. A pair of front wheels, and a pair of rear wheels are operably coupled to the frame. A pair of laterally spaced-apart seating surfaces are supported by the frame. A pair of outermost lateral points of the vehicle define a trail compliant vehicle width.

According to a further illustrative embodiment of the present disclosure, an all-terrain vehicle includes a frame and a pair of laterally spaced-apart seating surfaces supported by the frame. The all-terrain vehicle further includes a pair of front wheels, and a pair of rear wheels spaced-apart from the pair of front wheels by a wheelbase distance. The pairs of front and rear wheels are adapted to support the frame above a ground surface. The laterally spaced-apart seating surfaces are supported above the ground surface by a seat height distance. The all-terrain vehicle defines a ratio of the wheelbase distance to the seat height distance of at least 6.0 to 1.

The above mentioned and other features of this invention, and the manner of attaining them, will become more apparent and the invention itself will be better understood by reference to the following description of embodiments of the invention taken in conjunction with the accompanying drawings.

Figure 1:
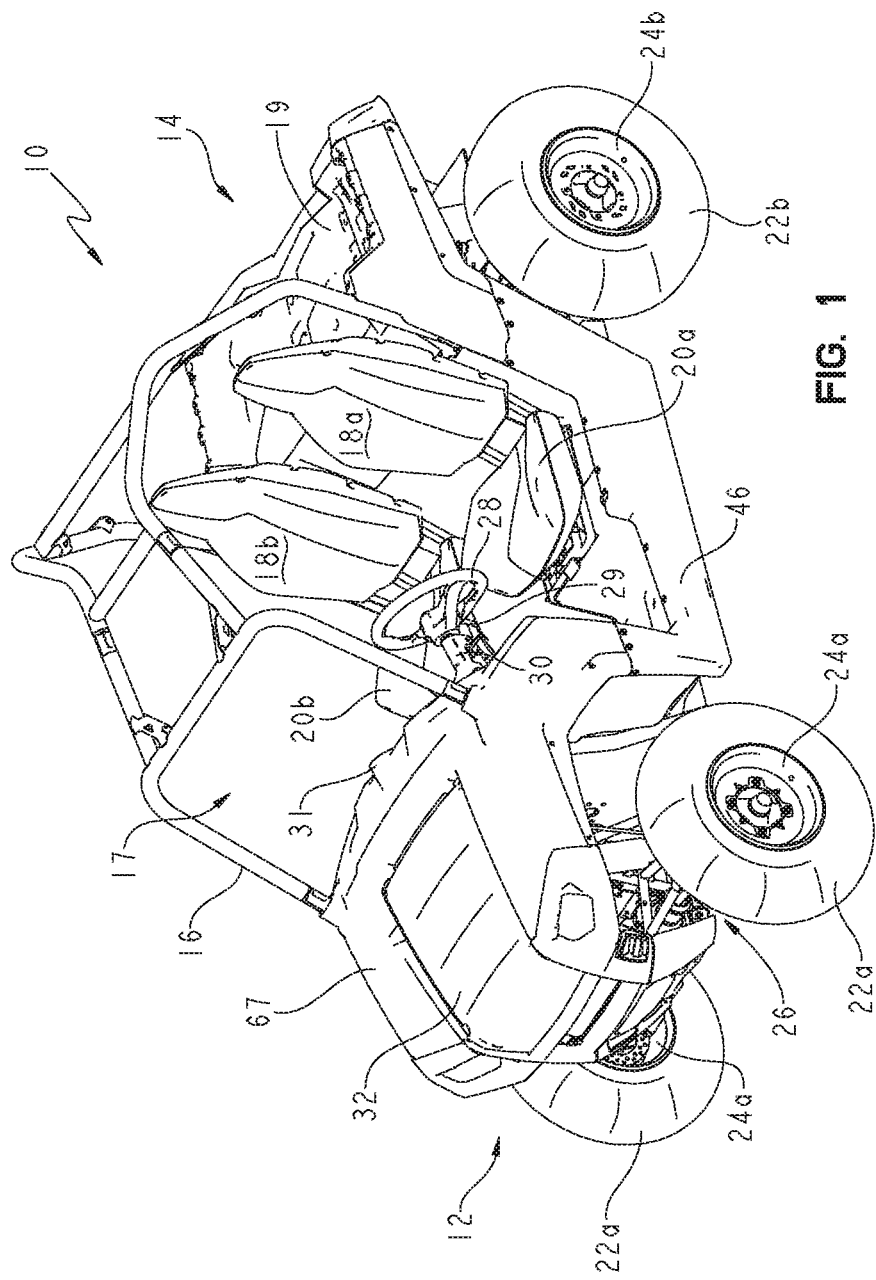
FIG. 1 is a perspective view of one embodiment of a side-by-side ATV.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF EMBODIMENTS OF THE INVENTION

The embodiments disclosed below are not intended to be exhaustive or to limit the invention to the precise forms disclosed in the following detailed description. Rather, the embodiments are chosen and described so that others skilled in the art may utilize their teachings. For example, while the following description refers primarily to a ATV, certain features described herein may be applied to other applications such as UVs, snowmobiles, motorcycles, mopeds, etc.

Referring initially to FIG. 1, one illustrative embodiment of side-by-side ATV 10 is shown. AV 10 includes front end 12 and rear end 14, and a frame 15 which is supported above the ground surface by a pair of front tires 22a and wheels 24a and a pair of rear tires 22b and wheels 24b. AV 10 includes a pair of laterally spaced-apart upper and lower seating surfaces 18a, 18b and 20a, 20b, respectively. The upper seating surfaces 18a, 18b are configured to support the backs of sitting riders, while the lower seating surfaces 20a, 20b are configured to support the buttocks of sitting riders. In the illustrative embodiment, upper and lower seating surfaces 18a, 18b, and 20a, 20b form a bucket seat arrangement, however a bench style seat or any other style of seating structure may be used. Upper and lower seating surfaces 18 and 20 are positioned within cab 17 of ATV 10.

Figure 2:
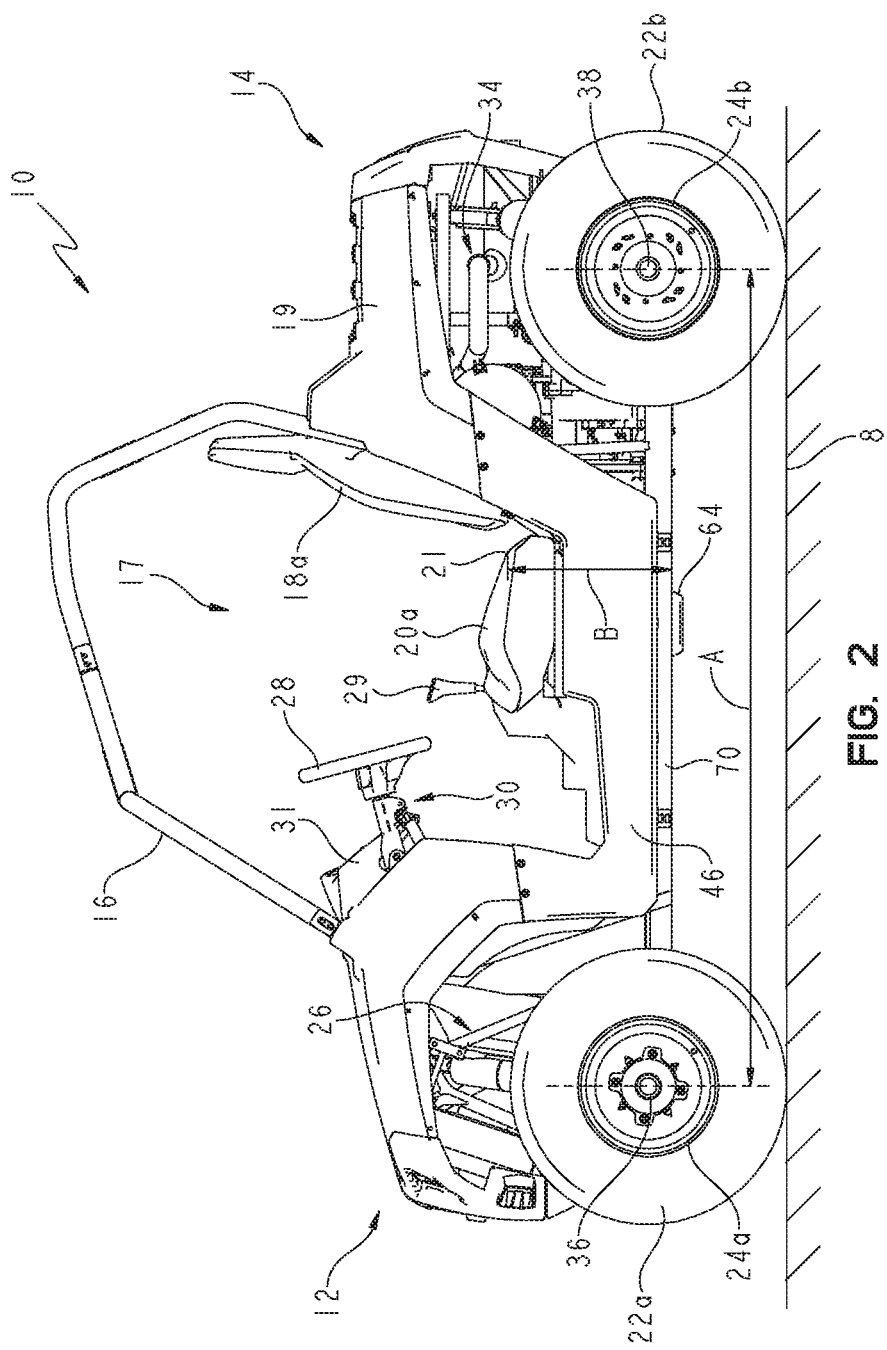
FIG. 2 is a profile view of the side-by-side ATV shown in FIG. 1.
Figure 14:
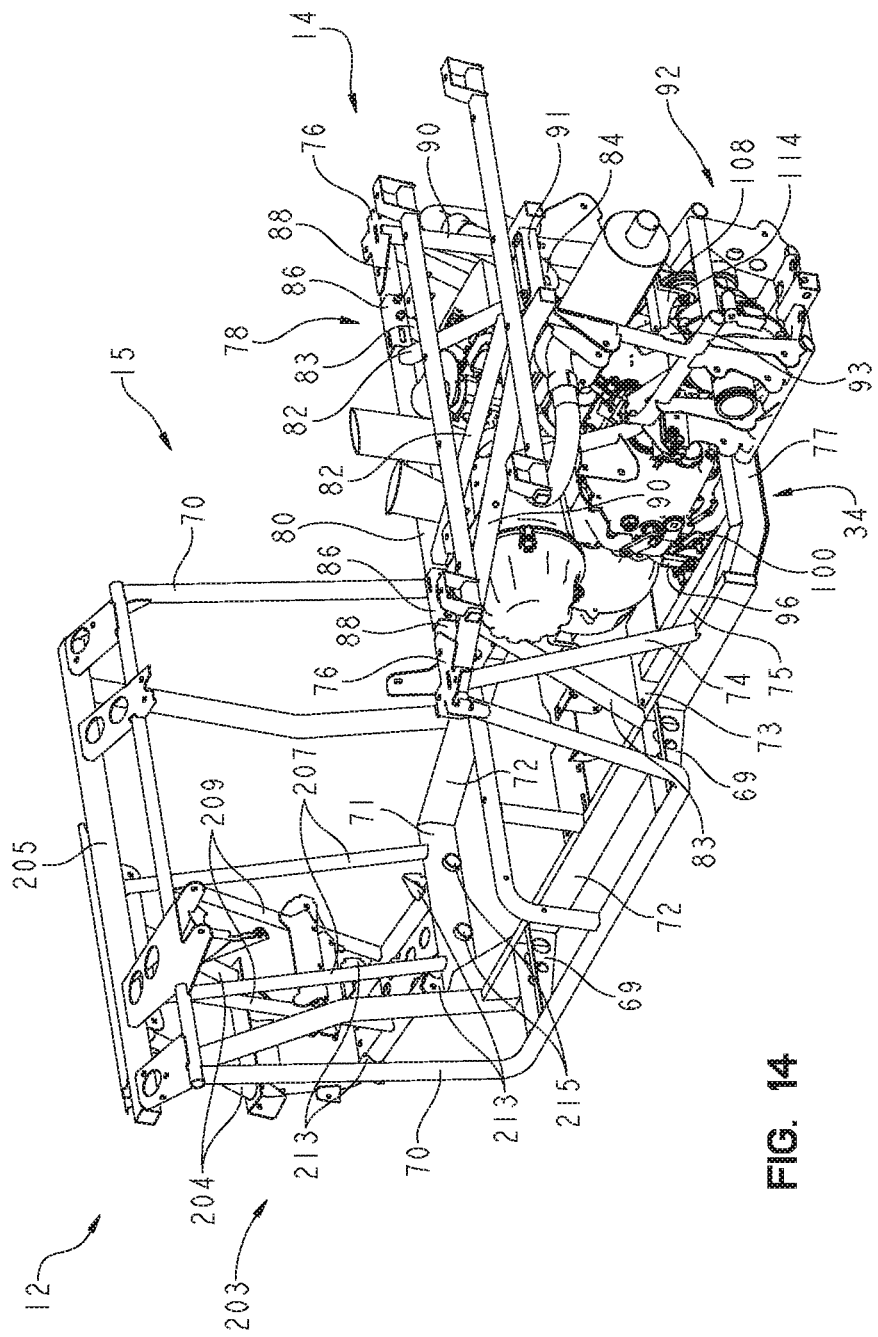
FIG. 14 is a rear perspective view of the frame and the modular engine assembly of the side-by-side AV shown in FIGS. 1 through 4.
Figure 15:
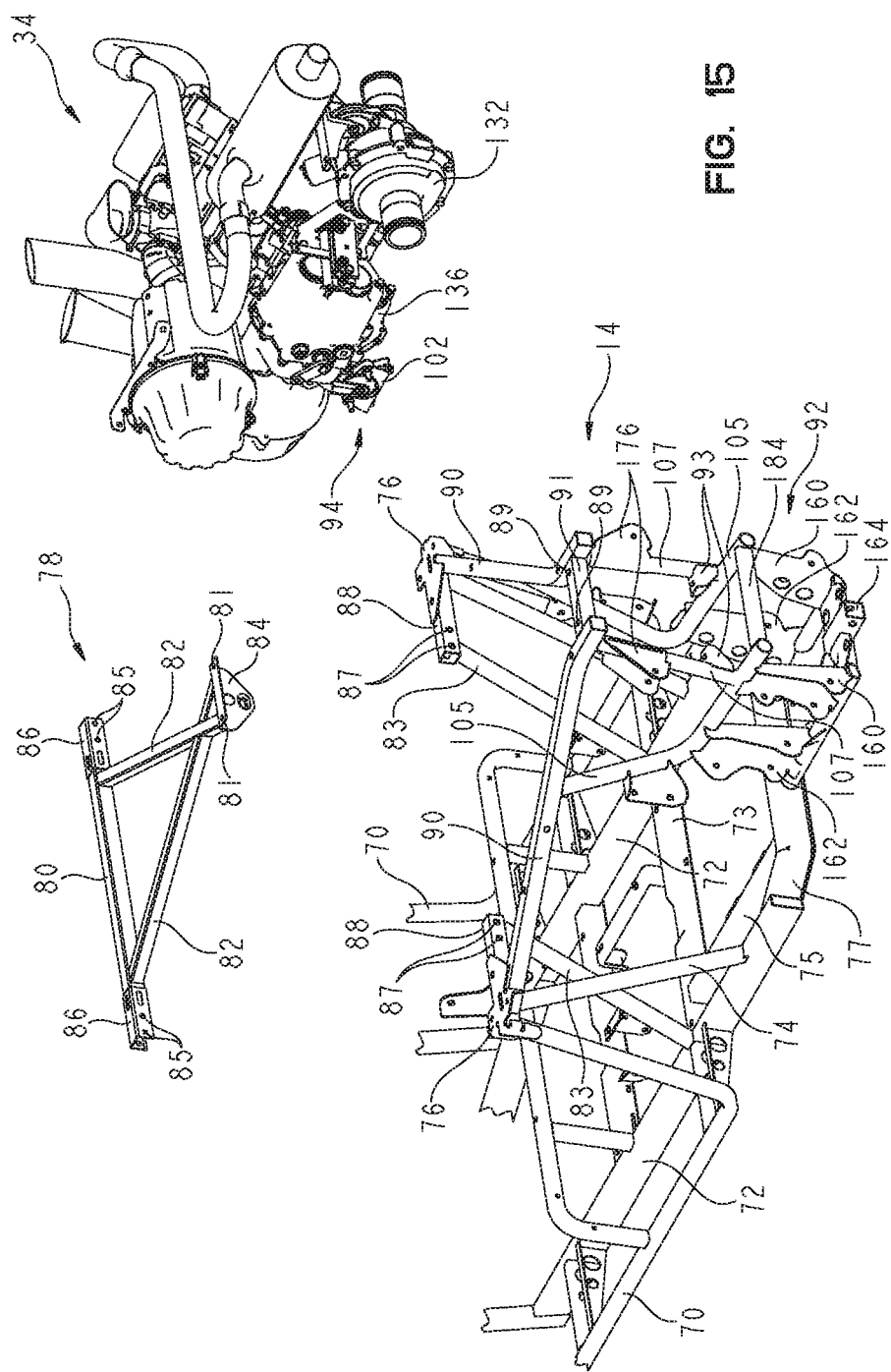
FIG. 15 is a partially exploded, rear perspective view of the frame and modular engine assemblies shown in FIG. 14.

Protective cage 16 extends over cab 17 to assist in preventing injury to passengers of ATV 10 from passing branches or tree limbs, as well as, may act as a support in the event of a vehicle rollover. As shown in FIGS. 1 through 4, protective cage 17 narrows as it extends upwardly to allow the driver and passenger easier entry and exit of cab 17. Additionally, in some embodiments a cover including one or more of a roof, windshield and doors (not shown) may be attached to the protective cage 16 to block weathering elements such as wind, rain or snow. Cab 17 also includes front console 31, adjustable steering wheel 28, and shift lever 29. Front console 31 may include a tachometer, speedometer, or any other suitable instrument. Front end 12 of ATV 10 includes front panel 67, hood 32, and front suspension assembly 26. Front suspension assembly 26 pivotally couples front wheels 24 to ATV 10. Rear end 14 of ATV 10 includes engine cover 19 which extends over modular engine assembly 34, as shown in FIGS. 2, 14, and 15. Modular engine assembly 34 is illustratively positioned completely behind upper and lower seating surfaces 18a, 18b, and 20a, 20b.

As shown in FIG. 2, front wheels 24 are supported for rotation by front axle 36. Similarly, rear wheels 24b are supported for rotation by rear axle 38. In the illustrative embodiment shown in FIG. 2, wheelbase A, which extends between the center of front axle 36 and the center of rear axle 38, is equal to about 77 inches (195.6 centimeters). Seat height B is equal to the distance between a low point 21 of lower seating surfaces 20 and a bottom of the frame 15 when ATV 10 is at rest. In the illustrative embodiment, seat height B is equal to about 11.75 inches (29.8 centimeters). In the illustrative embodiment, the ratio of the wheelbase to the seat height, or distance A to distance B, is about 6.55 to 1. In other embodiments, not shown, the ratio of the wheelbase to the seat height may be equal to other suitable ratios, however the present invention contemplates ATVs having a ratio of wheelbase to seat height greater than about 6.0 to 1. A wheelbase to seat height ratio greater than about 6.0 to 1 facilitates a relatively low vehicle center of gravity and further provides improved ergonomics, handling, and space utilization.

Figure 3:
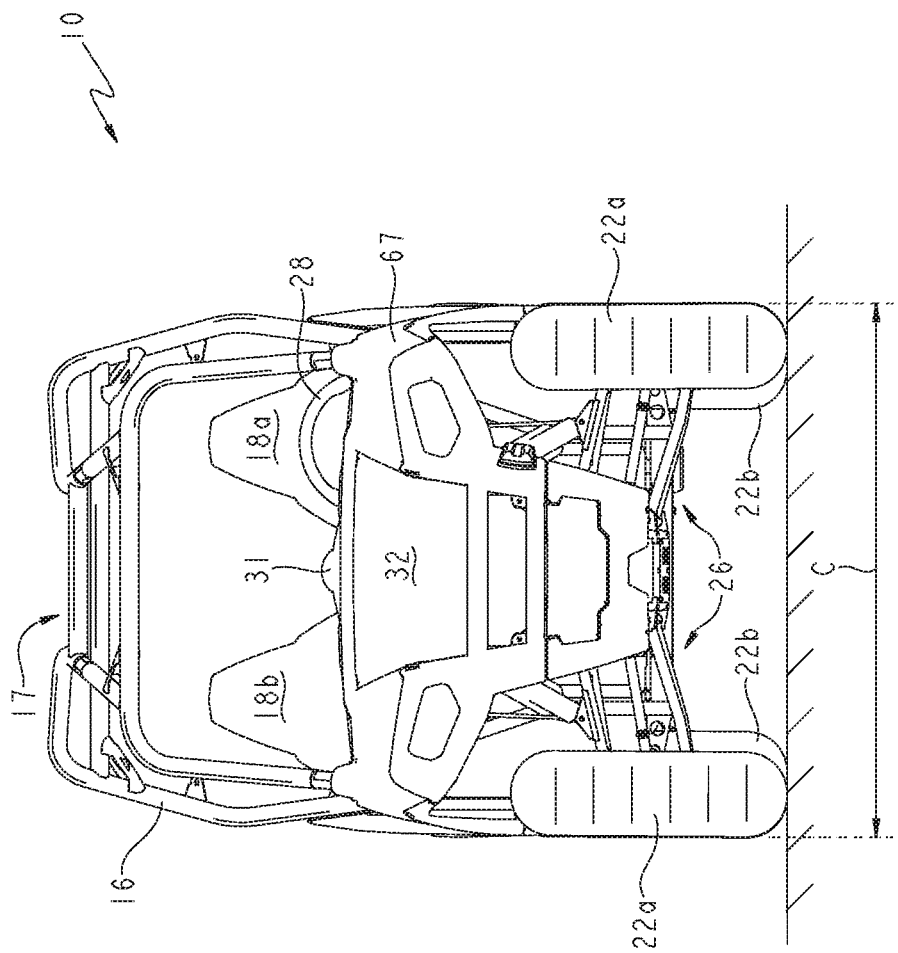
FIG. 3 is a front view of the ATV shown in FIGS. 1 and 2.
Figure 4:
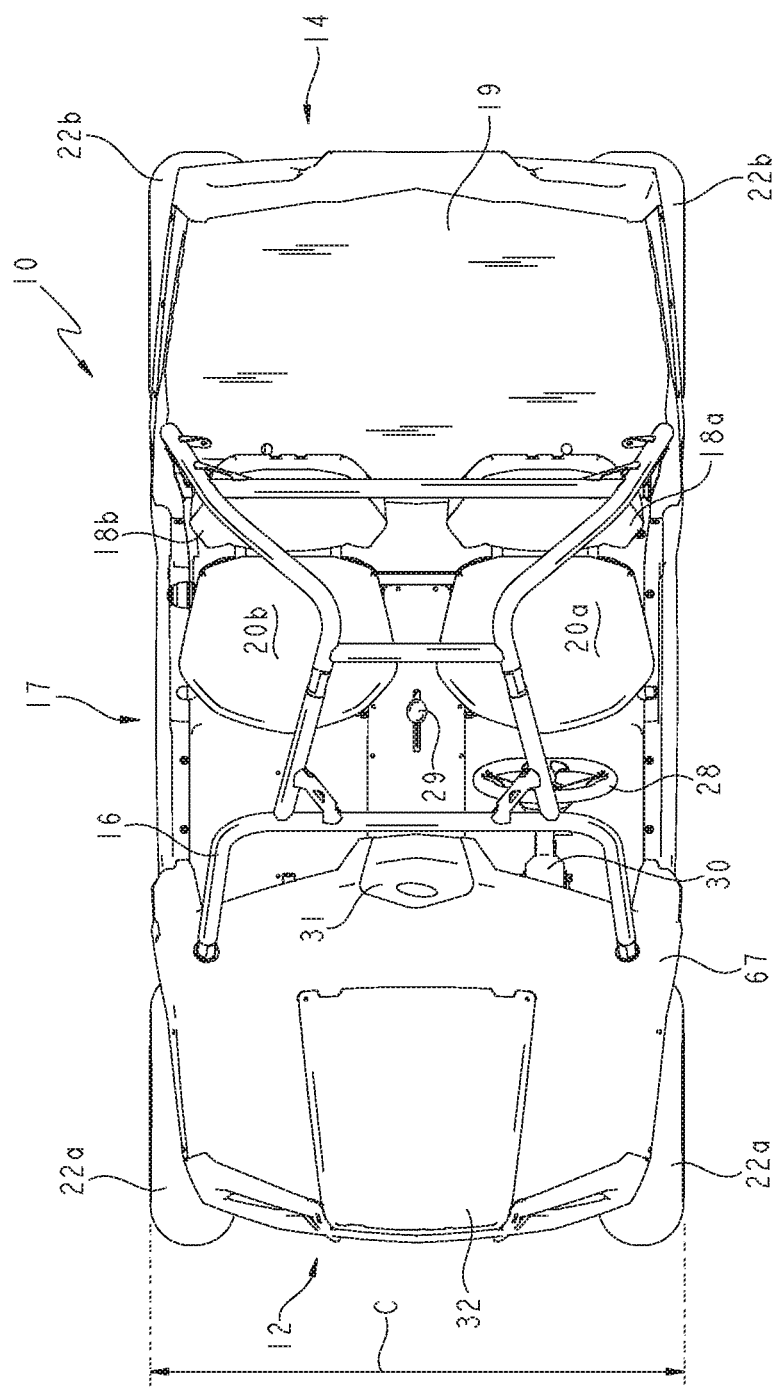
FIG. 4 is a top plan view of the side-by-side AV shown in FIGS. 1 through 3.

Referring now to FIGS. 3 and 4, a front view and top plan view of ATV 10 is shown. In the illustrative embodiment, width C, which is defined as the overall width of ATV 10, extends between the outermost lateral points of ATV 10. In the illustrative embodiment, outer surfaces of tires 22 on the front and rear ends of ATV 10 define the outermost points. In other embodiments, width C may be measured from the outer fenders of front panel 67. It may be appreciated that width C may be defined by both the outer surfaces of tires 22 and fenders of front panel 67, should the respective dimensions be substantially equal. In the illustrative embodiment, width C is about 50 inches. In other embodiments, ATV 10 may be constructed to other suitable widths, however the present invention contemplates ATVs having a trail compliant width or less than about 54 inches.

Figure 5:
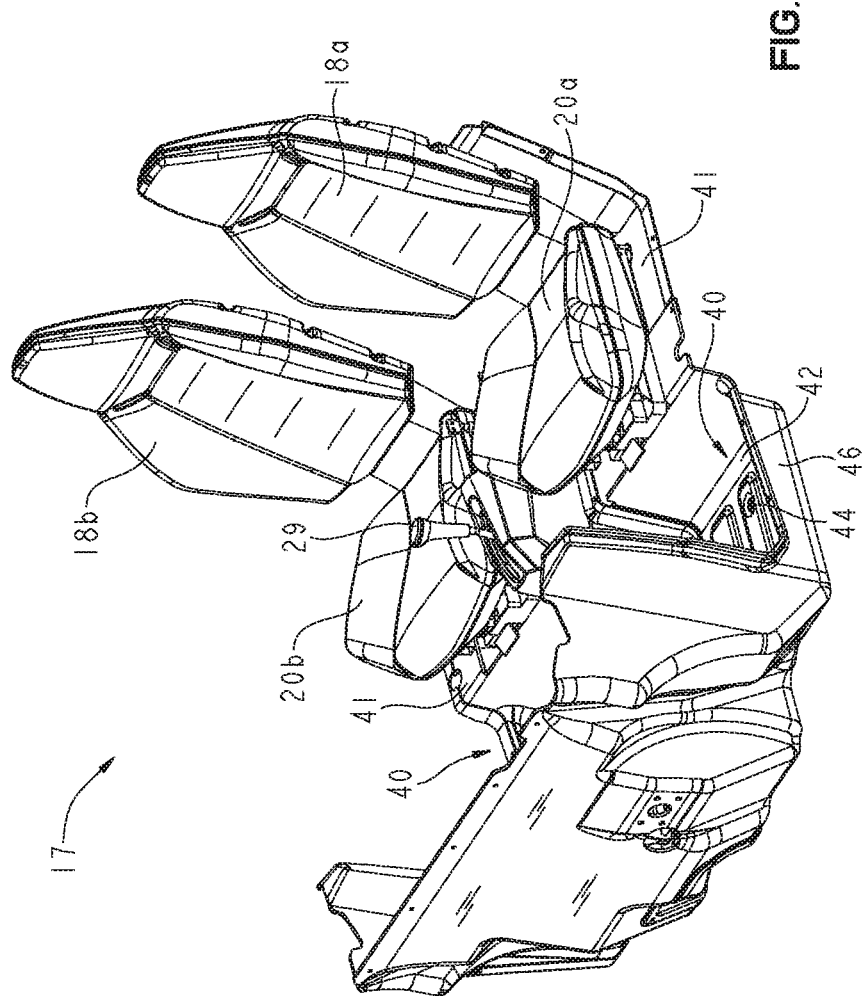
FIG. 5 is a partial perspective view of the cab area of the side-by-side ATV shown in FIGS. 1 through 4.
Figure 6:
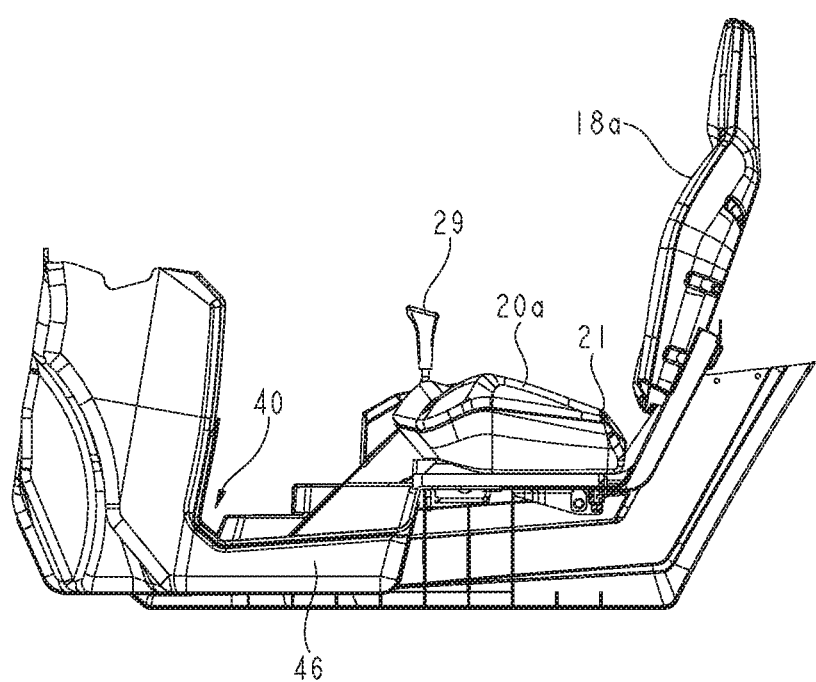
FIG. 6 is a partial profile view of the cab area shown in FIG. 5.

Referring now to FIG. 5, a partial view of cab 17 of ATV 10 is shown. Lower seating surfaces 20 are coupled to base 41 of ATV 10. Foot well area 40 extends below base 41 and encloses each passenger's feet and lower leg portions. Foot well area 40 includes floorboard 42 and side panel 46 on each side of ATV 10. Floorboard 42 includes an aperture 44 positioned to allow fluid to drain out of floorboard 42. Side panel 46 extends upwardly from floorboards 42 on each side of ATV 10. In the illustrative embodiment, side panels 46 extend upward about 4 inches (10.2 centimeters) from floorboards 42, however side panels 46 may be constructed to any suitable height. Side panels 46 and foot well areas 40 prevent the feet and lower leg portions of the driver and passenger of ATV 10 from moving outside of cab 17 when ATV 10 is in motion, for example when traversing rough terrain. In other embodiments (not shown), side panels 46 may be removed to allow easier entry and exit into cab 17 of ATV 10.

Figure 7:
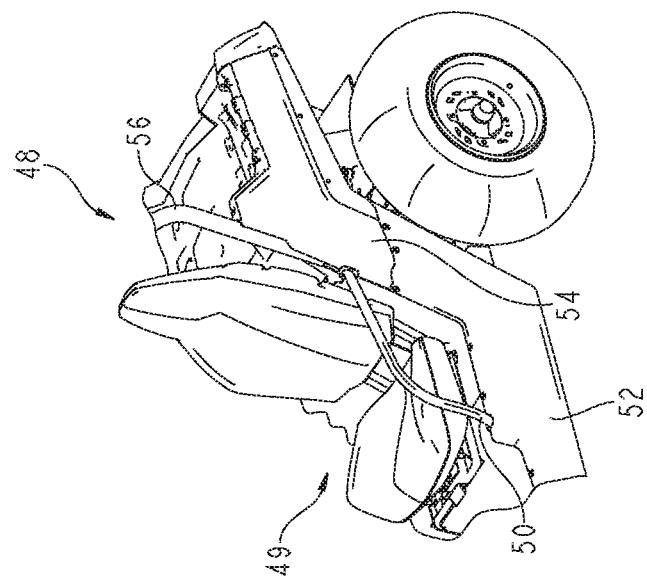
FIG. 7 is a partial perspective view of one embodiment of a guard rail that may be used on a side-by-side ATV, such as the side-by-side ATV shown in FIG. 1.

Referring now to FIG. 7, an illustrative embodiment of a side-by-side ATV 48 is shown. ATV 48 includes driver's side seat 49, side panel 52, and engine cover 54. Tube 56 extends upward from engine cover 54 to form protective cage 16. Seat guard 50 is coupled between engine cover 54 and side panel 52 to prevent a passenger positioned on seat 49 from sliding laterally off of seat 49 during vigorous driving. Additionally, seat guard 50 may provide protection against passing external obstacles. Seat guard 50 may also be included on the passenger's side of ATV 48.

Figure 8:
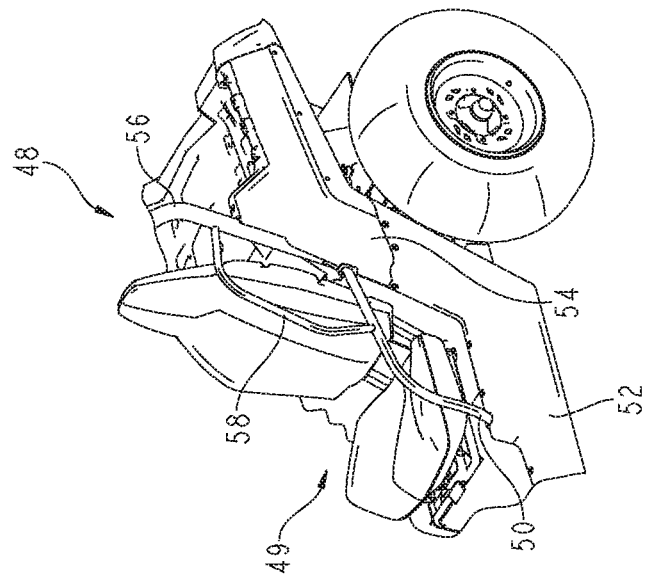
FIG. 8 is another embodiment of a guard rail that may be used on a side-by-side ATV, such as the side-by-side ATV shown in FIG. 1.

Referring now to FIG. 8, another illustrative embodiment of ATV 48 is shown including an additional safety bar 58. In this embodiment, safety bar 58 couples between tube 56 and seat guard 50 to further enclose a passenger in the cab area of AV 48. Additionally, safety bar 58 may be used as a handle when entering or exiting ATV 48. Safety bar 58 may also be included on the passenger's side of ATV 48. Additionally, there may be a panel or restrictive member, such as a mesh netting, placed between one or more of seat guard 50, safety bar 58, tube 56 and side panel 52 to further restrict the driver's or passenger's appendages from exiting the vehicle during vigorous driving.

Figure 9:
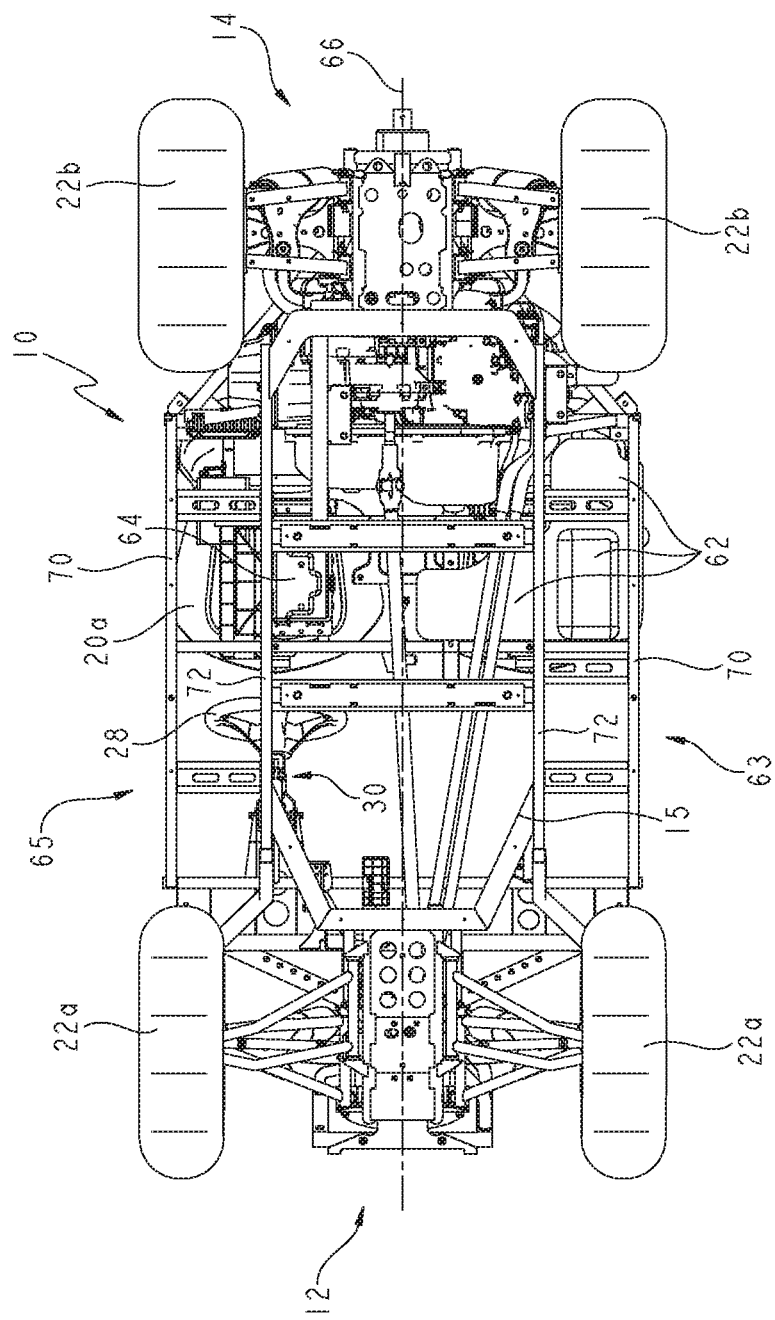
FIG. 9 is a bottom plan view of the side-by-side ATV shown in FIGS. 1 through 4.
Figure 10:
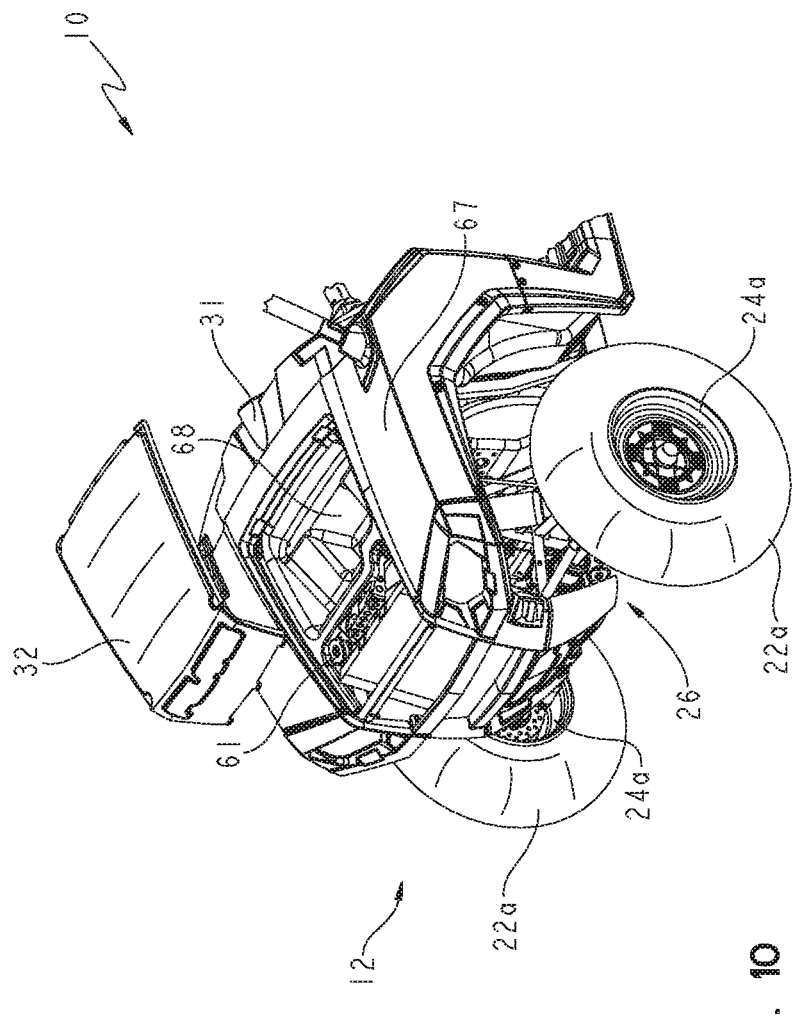
FIG. 10 is a partially exploded, perspective view of the front end of the AV shown in FIGS. 1 through 4.
Figure 11:
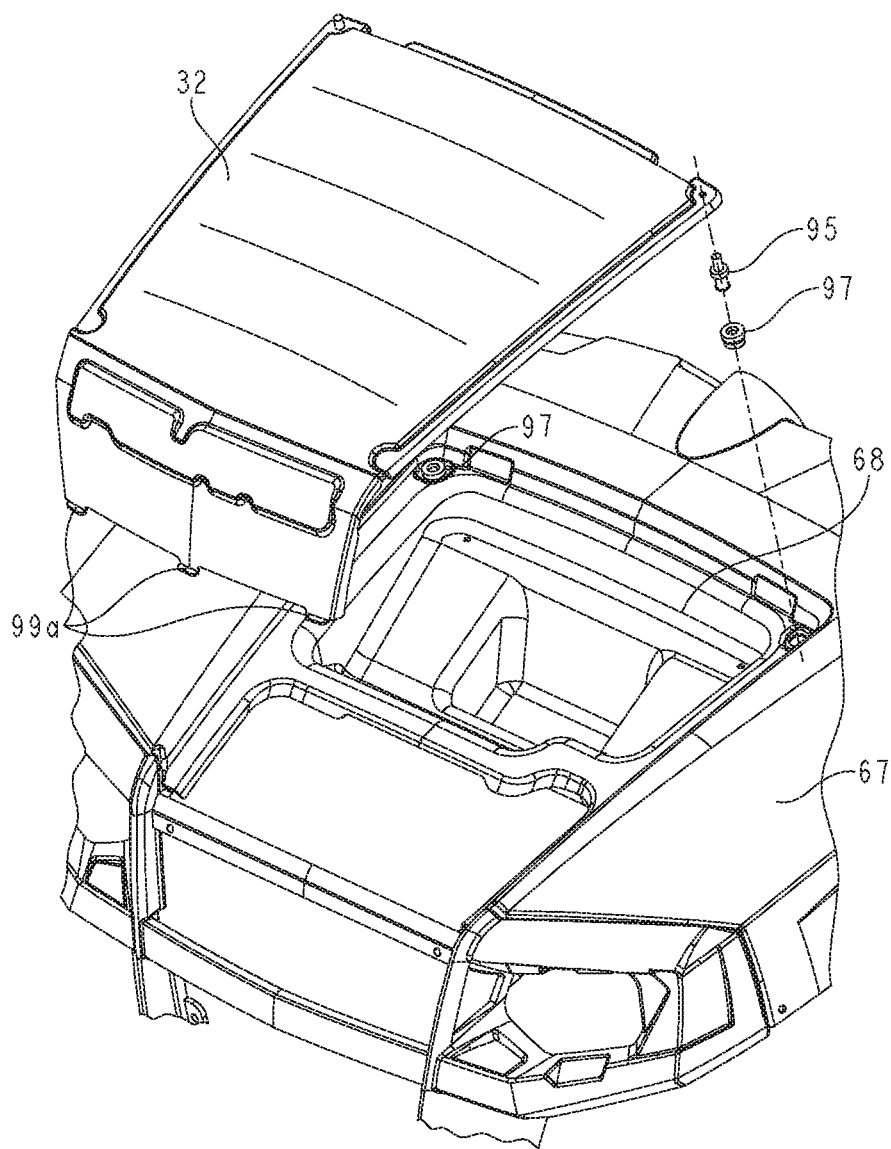
FIG. 11 is a partially exploded, perspective view similar to FIG. 10 showing hood mounting details.
Figure 12:
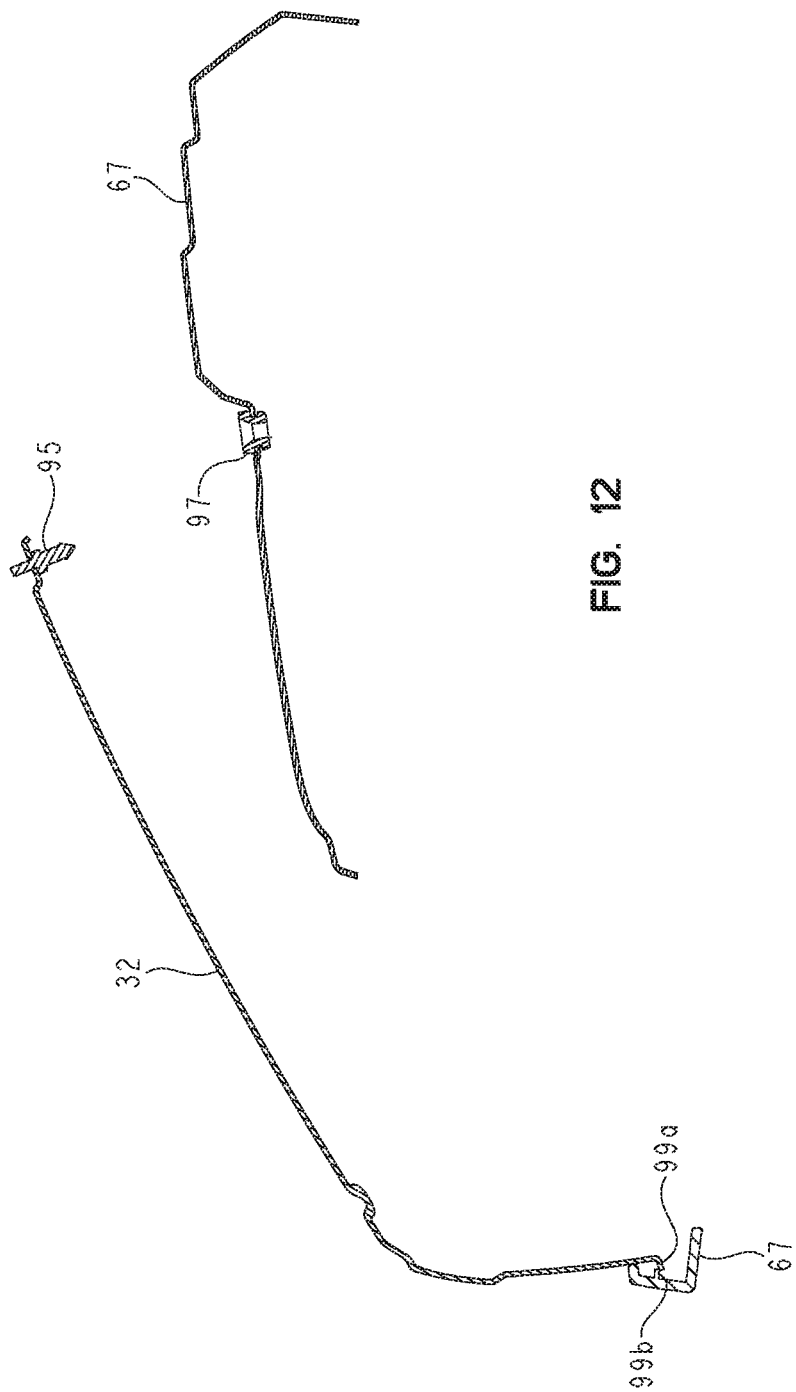
FIG. 12 is a cross-sectional view illustrating the hood mounting with the hood partially removed from the front panel.
Figure 13:
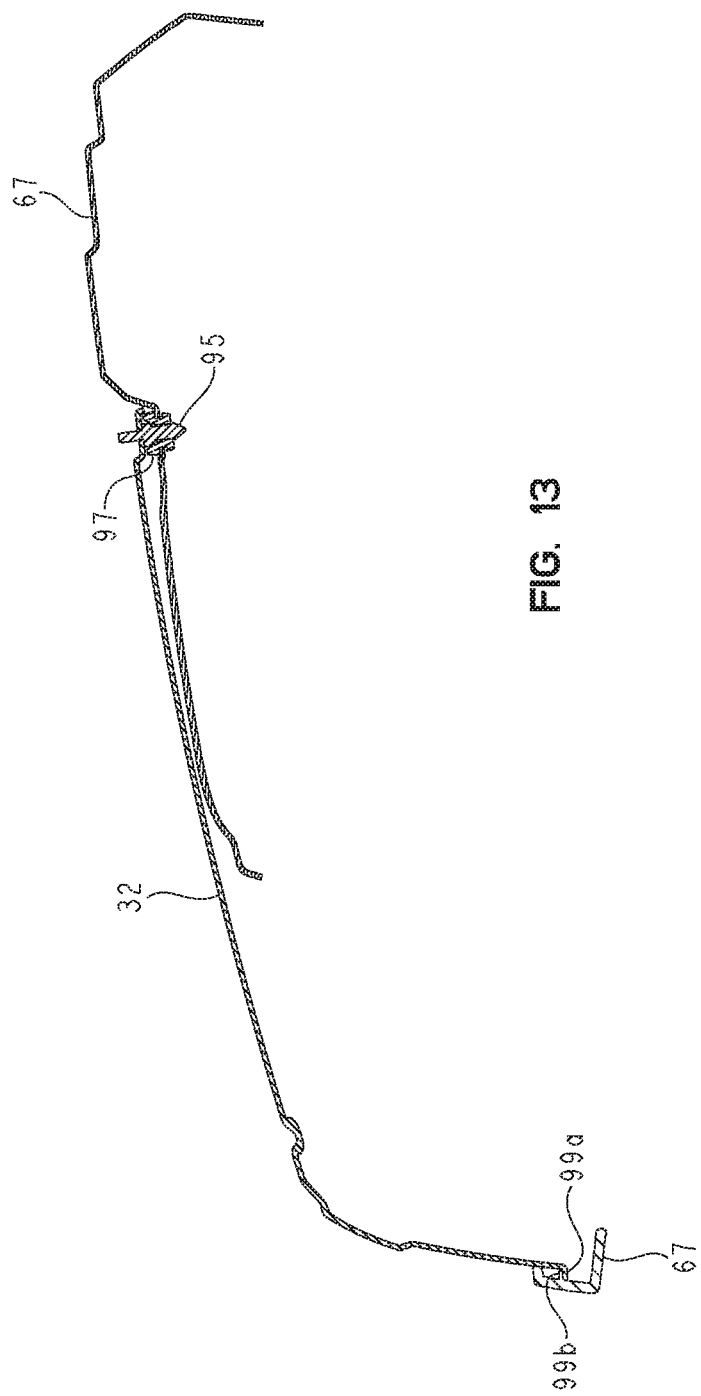
FIG. 13 is a cross-sectional view similar to FIG. 12 with the hood coupled to the front panel.

Referring now to FIG. 9, an illustrative bottom plan view of ATV 10 is shown. For simplicity, the floorboards and bottom side shielding have been removed. In this embodiment, driver's side 65 of ATV 10 is shown on the upper portion of FIG. 9 and passenger's side 63 is shown on the lower portion of FIG. 9. Longitudinal axis 66 separates driver's side 65 from passenger's side 63 and defines the longitudinal center line of ATV 10. In this embodiment, various relatively heavy components are positioned vertically proximate the frame 15 to lower the vehicle's center of gravity, thereby improving balance and stability. For example, fuel tank 62 is positioned under lower seating surface 20*b* on passenger's side 63 of ATV 10. Fuel tank 62 is supported by frame 15. As shown, fuel tank 62 is L-shaped, however any suitably shaped fuel tank may be used. Positioning fuel tank 62 on passenger's side 63 improves the balance of ATV 10 when only a driver is present on driver's side 65 of ATV 10. Battery 64 is positioned under lower seating surface 20*a* on driver's side 65 of ATV 10. In this embodiment, battery 64 is positioned near axis 66 and relatively low on the ATV 10, thereby improving balance. Positioning of battery 64 near the seating surface 20*a* also allows for easier serviceability and for reduced routing of lines to the engine assembly 34.

Referring now to FIGS. 10-13, front end 12 of ATV 10 is shown in greater detail. Front end 12 includes hood 32, which may be removably coupled to front panel 67. As illustrated, a hood mounting assembly includes a pair of plungers or pegs 95 which are removably received within cylindrical grommets 97. Plungers 95 are fixed near the rear corners of the hood 32, while grommets 97 are fixed to the front panel 67 near the rear corners of a storage area 68. In this embodiment, plungers 95 and grommets 97 are illustratively formed of steel and a resilient material (such as an elastomer), respectively, however any suitable material may be used. The front of hood 32 includes a plurality of flanges 99*a* which are configured to cooperate with a lip 99*b* formed within front panel 67, thereby defining a releasable hinge.

In this illustrative embodiment, storage area 68 and access panel 61 are positioned under hood 32. Storage area 68 may receive a tool kit, cargo net or any other suitable vehicle accessory for ATV 10. Access panel 61 may include any suitable engine or vehicle maintenance port or terminal, such as a radiator fill cap, battery charging terminals, oil fill plug, or transmission fill plug.

Referring now to FIG. 14, one illustrative embodiment of frame 15 of a side-by-side ATV such as ATV 10 shown in FIG. 1 is shown. Frame 15 includes inner rails 72, front crossmember 71, mid crossmember 73, and rear crossmember 77. Frame 15 also includes outer tubes 70 that define the outermost width of frame 15. Rear assembly 92 is coupled to upper frame rails 90 and cross-member 77 and is described in more detail below. The portion of frame 15 between mid crossmember 73 and rear crossmember 77 supports modular engine assembly 34 of ATV 10. In this embodiment, modular engine assembly 34 may include a transmission 136 such as a continuously variable transmission, and a rear differential 132 prior to being installed in frame 15, as shown in FIG. 15.

Referring to FIGS. 14 and 15, inner rails 72 of frame 15 are coupled together on a front end by crossmember 71 and on the rear end by rear crossmember 77. Brackets 76 couple upper frame tubes 88, upper frame rails 90, vertical tubes 74, and outer tubes 70 together on each side of ATV 10. Outer tubes 70 are coupled to inner rails 72 by brackets 69. Vertical tubes 74 are coupled on a lower end to inner rails 72. Upper frame tubes 88 are coupled to support tubes 83 which are coupled on a lower end to inner rails 72. Upper frame rails 90 are coupled on a rear end to cross tube 91.

As shown in FIG. 15, modular engine assembly 34 may be preassembled before being installed in frame 15. During the construction of frame 15, upper brace 78 is attached to frame 15 to provide dimensional stability during welding. During installation of modular engine assembly 34, upper brace 78 is removed from frame 15 and modular engine assembly 34 is placed on frame 15. Upper brace 78 is then reattached to frame 15. More particularly, after modular engine assembly 34 is positioned between upper frame rails 90 in frame 15, as shown in FIG. 14, upper brace 78 may be installed.

Upper brace 78 includes outer brackets 86, rear bracket 84, crossmember 80 and angular members 82. Angular members 82 are coupled together on an end by bracket 84 and on an opposing end by crossmember 80. Each bracket 86 is substantially U-shaped and includes apertures 85. U-shaped brackets 86 are adapted to overlap upper frame tubes 88. Apertures 85 in brackets 86 and apertures 87 in upper frame tubes 88 align and accept fasteners to secure upper brace 78 to upper frame tubes 88. Bracket 84 includes apertures 81 which align with aperture 89 in cross tube 91 and may be secured using any suitable fasteners.

Figure 18:
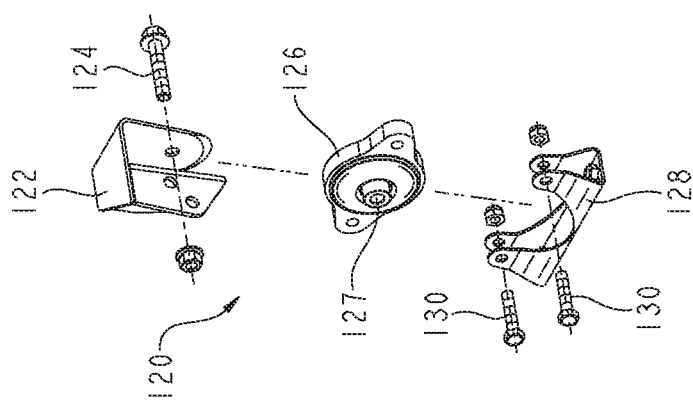
FIG. 18 is an exploded perspective view of yet another embodiment of an engine mounting assembly that may be used on an ATV such as the side-by-side ATV shown in FIGS. 1 through 4.
Figure 17:
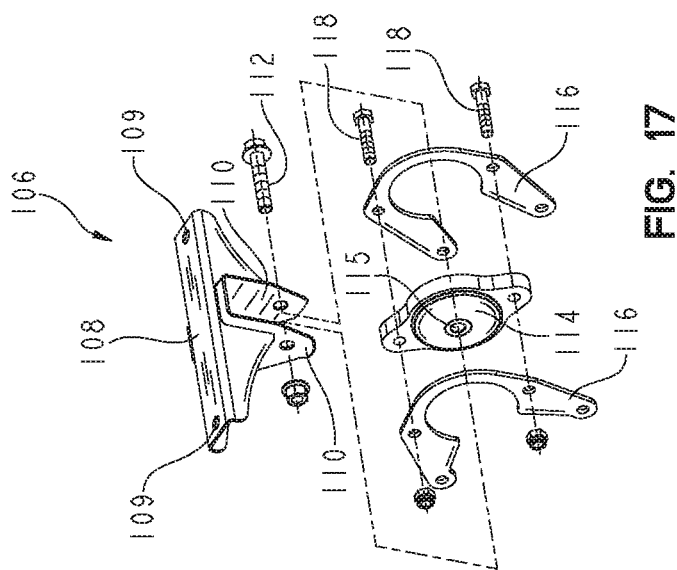
FIG. 17 is an exploded perspective view of another embodiment of an engine mounting assembly that may be used on an ATV such as the side-by-side ATV shown in FIGS. 1 through 4.
Figure 16:
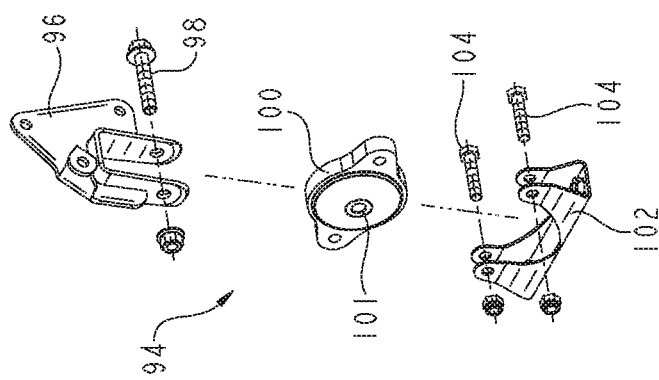
FIG. 16 is an exploded perspective view of one embodiment of an engine mounting assembly that may be used on an ATV such as the side-by-side ATV shown in FIGS. 1 through 4.

In this embodiment, modular engine assembly 34 is mounted on frame 15 of ATV 10 using a three position mounting system to allow modular engine assembly 34 to be dropped into frame 15 and bolted or attached as one unit. Illustrative embodiments of each of the three mounting assemblies are shown in FIGS. 16 through 18. Referring now to FIG. 16, mounting system 94 positioned on the driver's side of modular engine assembly 34 and frame 15 is shown. Bracket 96 is mounted to modular engine assembly 34 prior to installation of modular engine assembly 34 in frame 15. Lower bracket 102 is coupled to rail 75 of frame 15 and receives mounting plate 100. Mounting plate 100 is coupled to bracket 102 by fasteners 104.

During installation of modular engine assembly 34 into frame 15, bracket 96 is aligned with mounting plate 100 and fastener 98 is positioned in an aperture in bracket 96 and aperture 101 of mounting plate 100 to secure bracket 96 and modular engine assembly 34 to frame 15. Similarly, mounting assembly 120, as shown in FIG. 18, is positioned on the passenger's side of modular engine assembly 34 and frame 15. Bracket 128 is coupled to frame 15. Mounting plate 126 is coupled to bracket 128 by fasteners 130. Bracket 122 is coupled to the passenger's side of modular engine assembly 34 and is positioned such that an aperture in bracket 122 aligns with central aperture 127 of mounting plate 126 when modular engine assembly 34 is installed in frame 15. Fastener 124 extends through the aperture in bracket 122 and aperture 127 in mounting plate 126 to secure modular engine assembly 34 to frame 15.

Modular engine assembly 34 is also mounted to frame 15 by a third mounting assembly shown in FIGS. 14 and 17. Mounting assembly 106 includes bracket 108, side plates 116, and mounting plate 114. Bracket 108 couples to brackets 93 of rear assembly 92. Bracket 108 includes vertically extending plates 110 and is coupled to brackets 93 by extending fasteners (not shown) through apertures 109. Side plates 116 are coupled to rear differential 132 of engine assembly 34. Mounting plate 114 is coupled between side plates 116 by fasteners 118. During installation of modular engine assembly 34 in frame 15, vertically extending plates 110 of bracket 108 are positioned one each side of mounting plate 114. Fastener 112 is then positioned through apertures in vertically extending plates 110 and aperture 115 of mounting plate 114 to secure modular engine assembly 34 in frame 15.

Figure 19:
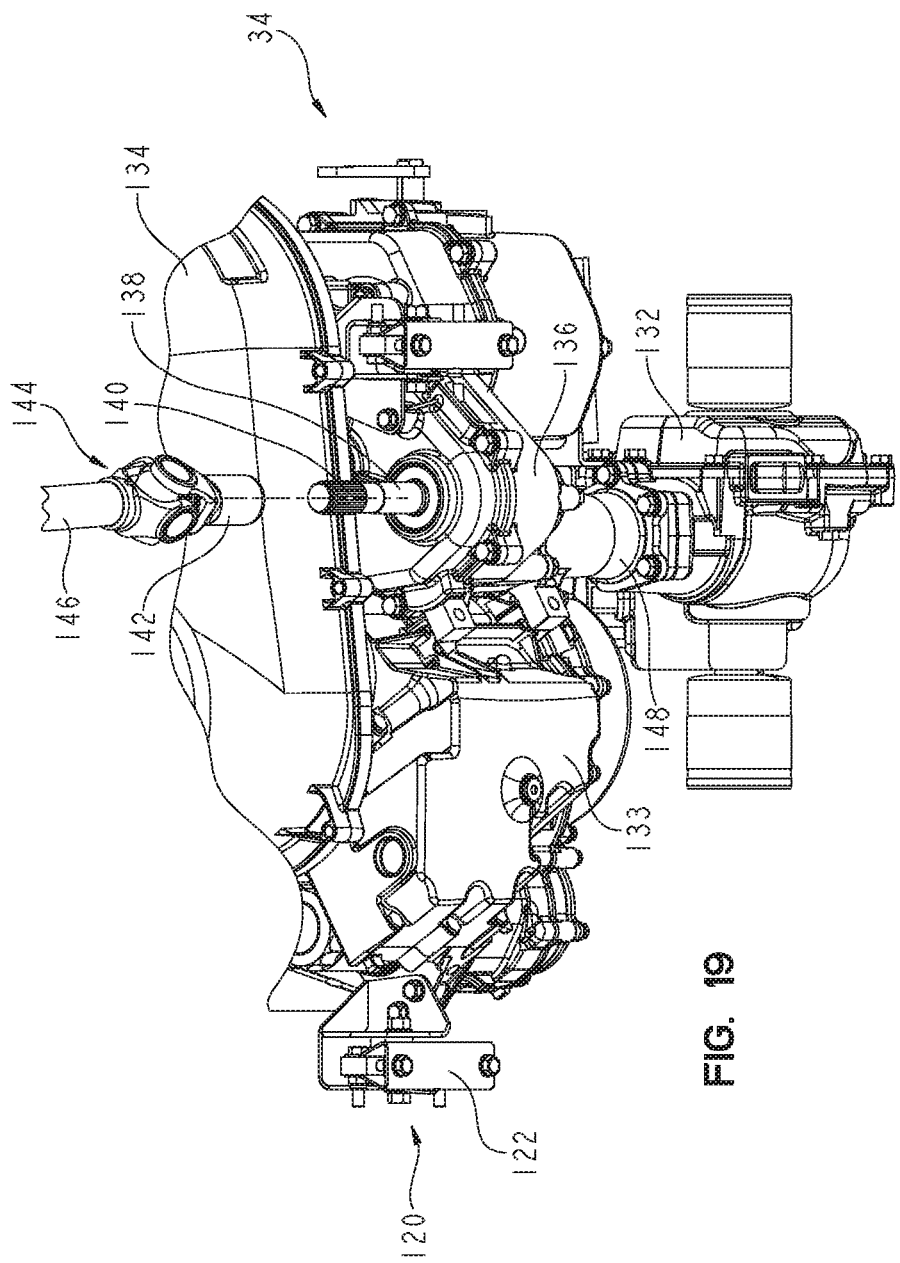
FIG. 19 is a partial front perspective view of the bottom side of the drive train components of the side-by-side ATV shown in FIGS. 1 through 4.

Referring now to FIG. 19, a partial forward-facing, bottom side perspective view of the drivetrain components of ATV 10 is shown. Modular engine assembly 34 includes engine 133, transmission 136, and rear differential 132. In this embodiment, the crankshaft (not shown) of engine 133 is parallel with the fore/aft direction of ATV 10 and provides for a narrower overall vehicle width and improved center of gravity of ATV 10. In this embodiment, engine 133 is a 760 cc engine producing about 50 horsepower. Engine 133 produces excellent acceleration characteristics and responsiveness. ATV 10 weighs about 950 pounds (430.9 kilograms) and has a power to weight ratio of about 0.053/1 (horsepower/pound). Any suitable engine may be used in ATV 10, and ATV 10 may be constructed to any suitable weight, however the present invention contemplates ATVs having a power to weight ratio of at least 0.045/1 (horsepower/pound).

Rear differential 132 of modular engine assembly 34 is directly coupled to transmission 136 by housing 148 to maintain center distances and allow for easy assembly. In this illustrative embodiment, rear differential 132 is an electric rear lockable differential, however any suitable rear differential or rear axle may be used. Output shaft 138 extends outward from transmission 136 toward the front of ATV 10 and rotates to power front wheels 24a of AV 10. In this embodiment, ATV has on-demand all-wheel drive with switchable backdrive, however any suitable drivetrain such a two-wheel drive or four-wheel drive may be used.

As shown in FIG. 19, output shaft 138 extends under protective panel 134. Protective panel 134 is positioned behind upper and lower seating surfaces 18a, 18b and 20a, 20b and protects passengers in ATV 10 from moving parts of modular engine assembly 34, as well as, assists in shielding from noise. The extending end of output shaft 138 includes splined portion 140 which is adapted to engage the interior circumference of coupler 142. Coupler 142 is coupled to universal joint 144. Universal joint 144 connects coupler 142 to front drive shaft 146 which powers the front wheels of ATV 10. Coupler 142 may move in a fore and aft direction on splined portion 140 of output shaft 138 while remaining engaged with splined portion 140. During vigorous driving, front drive shaft 146 may move in the fore and aft direction causing coupler 142 to slide longitudinally on splined portion 140 of output shaft 138 while front drive shaft 146 remains rotationally coupled with output shaft 138.

Figure 20:
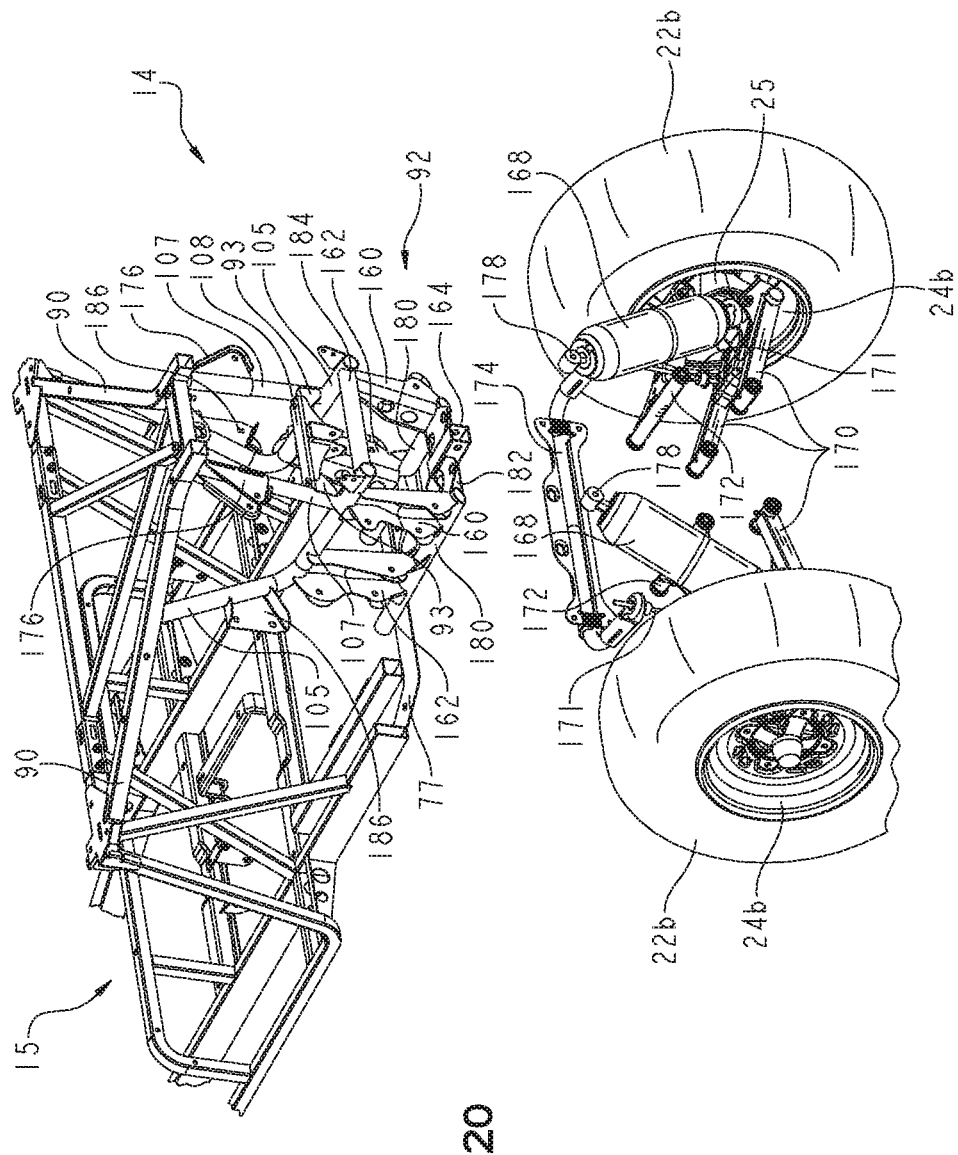
FIG. 20 is a partially exploded rear view of components of the frame and rear suspension system of the side-by-side ATV shown in FIGS. 1 through 4.
Figure 21:
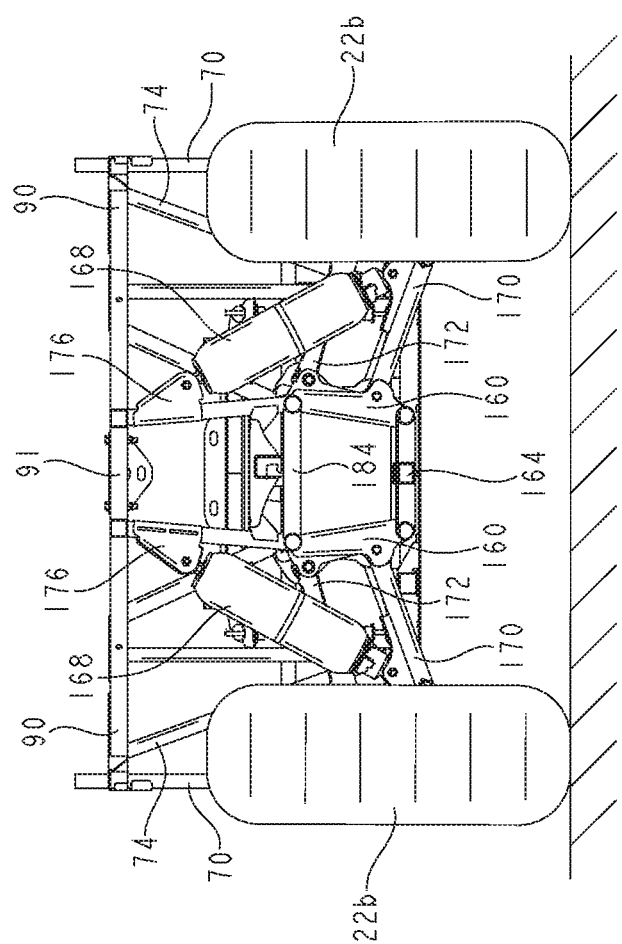
FIG. 21 is a rear view of the frame and suspension system of the ATV shown in FIG. 20.

Referring now to FIGS. 20 and 21, components of the rear suspension of ATV 10 is shown. Rear frame assembly 92 is formed by down tubes 105, vertical tubes 107, rear brackets 160, front brackets 162, lower tubes 180, and cross tubes 182 and 184. Down tubes 105 are coupled to upper frame rails 90 and extend rearward. Lower tubes 180 are coupled to rear crossmember 77 on one end. The opposing ends of lower tubes 180 are coupled together by cross tube 182. Cross tube 182 supports hitch 164 which may be used to couple to a trailer or other device for towing behind ATV 10. The lower ends of down tubes 105 are coupled together by cross tube 184. Front brackets 162 and rear brackets 160 extend between lower tubes 180 and down tubes 105. Vertical tubes 107 extend downward from upper frame rails 90 and couple to down tubes 105. Each down tube 105 includes bracket 186. Similarly, each vertical tube 107 includes bracket 176.

Rear wheels 24b include inner hub assemblies 25. The lower ends of upper and lower control arms 172 and 170 are coupled to inner hub assemblies 25 of rear wheels 24b. The lower ends of dampeners 168 are also coupled to inner hub assemblies 25. The upper ends of upper and lower control arms 172 and 170 are pivotally coupled to front and rear brackets 162 and 160 on each side of ATV 10. Upper ends 178 of dampeners 168 are coupled to brackets 176 on vertical tubes 107. Stabilizer or torsion bar 174 is coupled to inner hub assemblies 25 by rods 171. More particularly, rods 171 have upper ends connected to opposing ends of torsion bar 174 and lower ends connected to lower control arms 170. Torsion bar 174 is coupled to brackets 186 on down tubes 105 and provides a torsional transverse connection between the lower control arms 170 of rear wheels 24b.

Rear wheels 24b may move vertically in an independent manner along a path defined by upper and lower control arms 172 and 170. For example, when ATV 10 encounters rough terrain, rear wheels 24b may move upward and downward to maintain contact with a ground surface. By positioning brackets 176, which couple to dampeners 168, on vertical tubes 107 of frame 15, the load path generated when rear wheels 24b move upward is translated through vertically orientated frame members (vertical tubes 107) of frame 15. Additionally, torsion bar 174 provides interaction between the independent suspensions of the rear wheels 24b through respective control arms 170. As known in the art, during a turn, torsion bar 174 resists deflection of an outer rear wheel 24b due to centrifugal force by transmitting deflection to the inner rear wheel 24b. These elements may improve the ride and handling characteristics of ATV 10.

Figure 22:
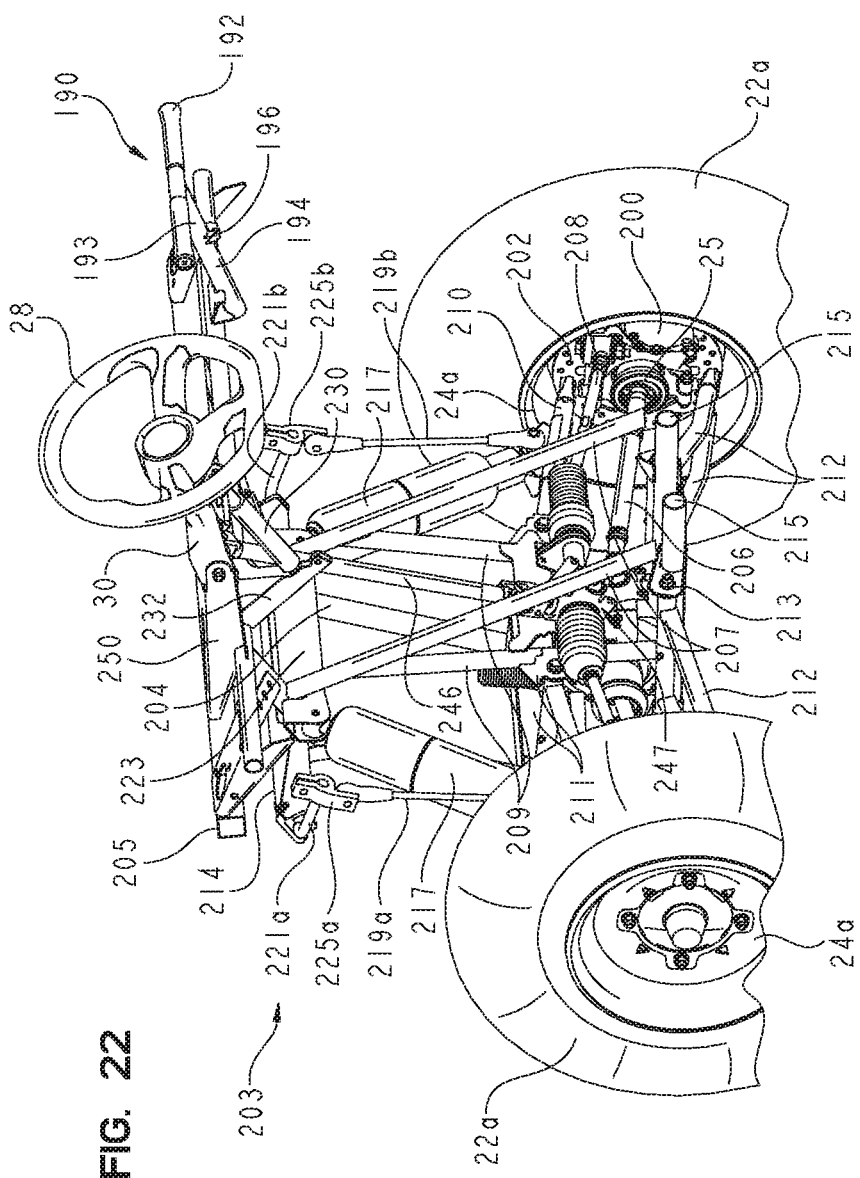
FIG. 22 is a partial rear perspective view of a steering mechanism and front axle assembly that may be used on an ATV such as the side-by-side ATV shown in FIGS. 1 through 4.
Figure 23:
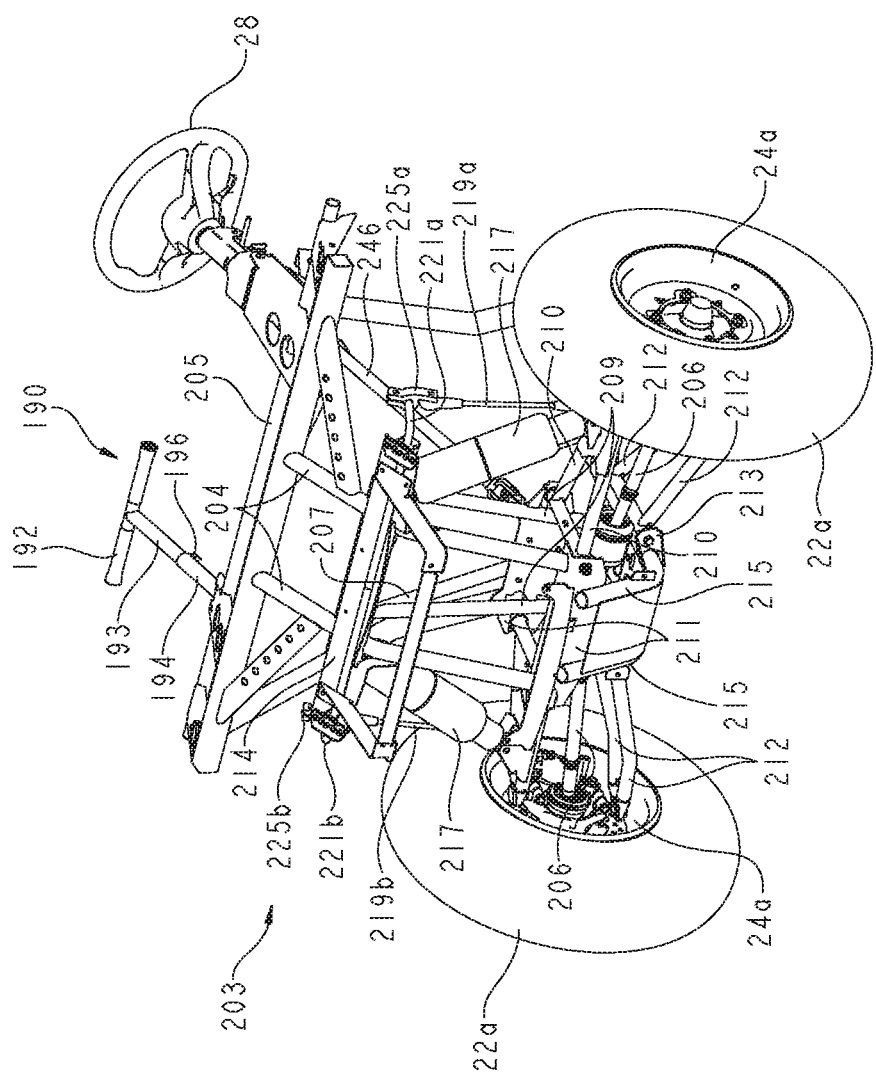
FIG. 23 is a partial front perspective view of the steering mechanism and front axle assembly of the ATV shown in FIG. 22.
Figure 24:
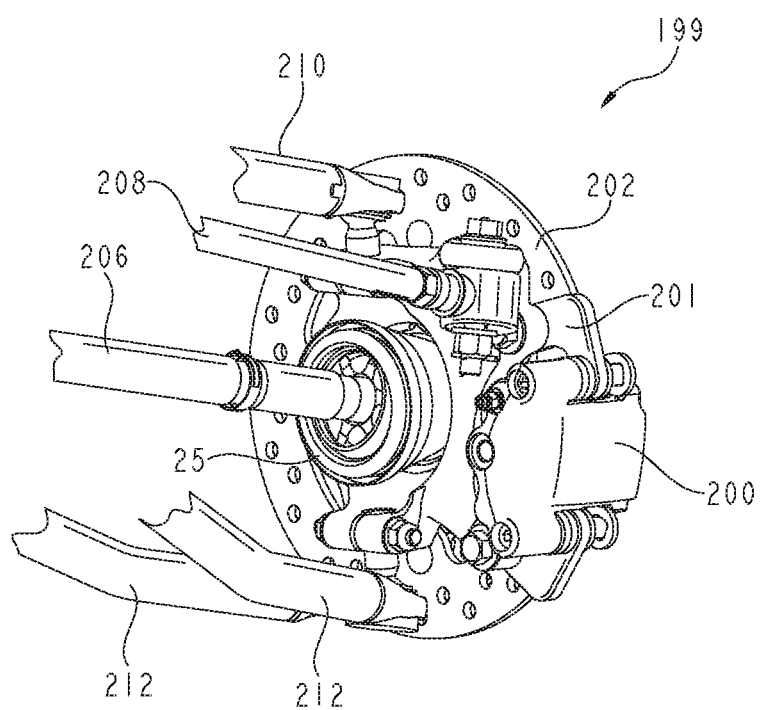
FIG. 24 is a partial perspective view of one embodiment of a braking assembly that may be used on an ATV such as the side-by-side ATV shown in FIGS. 1 through 4.

Referring now to FIGS. 22-24, components of the front suspension, including right front brake assembly 199 are shown. Front frame assembly 203 includes front tubes 204 coupled to an upper crossmember 205. Rear tubes 207 are positioned rearwardly of the front tubes 204 and are coupled to angled braces 209 and crossmember 71 (FIG. 14). Upper brackets 211 are supported by front tubes 204 and braces 209, while lower brackets 213 are supported by lower tubes 215. The lower ends of upper and lower control arms 210 and 212 couple to inner hubs 25 of wheels 24a. Lower ends of steering arms 208 (commonly called tie rods), and dampeners 217 are also coupled to inner hubs of wheels 24a. The upper ends of upper and lower control arms 210 and 212 are pivotally coupled to lower brackets on each side of ATV 10. Upper ends of dampeners 217 are pivotally coupled to bracket 223 extending between rear tubes 207. The control arms 210, 212 and dampeners 217 cooperate to define independent front suspensions for the right and left front wheels 24a. More particularly, front wheels 24a may move vertically in an independent manner along a path defined by upper and lower control arms 210 and 212.

With further reference to FIGS. 22 and 23, a stabilizer or torsion bar 214 is coupled to front tubes. Links or rods 219a and 219b are operably coupled to opposing left and right ends of torsion bar 214, illustratively through left and right clamps 225a and 225b and torque bars 221a and 221b, respectively. Rods 219 are coupled to inner hub assemblies 25 of right and left front wheels 24a through upper control arms 210. In use, when a force is exerted on one of the right and left front wheels 24a during vehicle travel, the front suspension may transmit a corresponding force on the other of the left and right front wheel 24a. For example, when an upward force is exerted on the left front wheel 24a due to, e.g., a bump or a turn, the corresponding upper and lower control arms 210 and 212 may move upward relative to the ATV 10. Such upward movement may urge the corresponding rod 219a upward, which may cause the corresponding end of the left torque bar 221a to move upward. The left torque bar 221a may act as a lever, exerting a torque on the left end of the torsion bar 214.

The torsion bar 214 may include a torque transfer regulator (not shown), which determines how much of the torque exerted by the left torque bar 221a (or right torque bar 221b) is transferred to the right torque bar 221b (or left torque bar 221a). Clamps 225a and 225b may be repositioned or moved along torque bars 221a and 221b to change the suspension effect. In the current example, upward movement of the left torque bar 221a may cause upward movement of the right torque bar 221b, thereby urging the right rod 219b and connected control arms 210 and 212 upward. The upward movement of the right control arms 210 and 212 may exert an upward force on the right front wheel 24a. Thus, the front suspension may exert on the right front wheel 24a a portion of the upward force that a travel surface exerts on the left front wheel 24a. While the current example involved a force exerted by the travel surface on the left front wheel 24a, the front suspension may operate in a similar manner when a force is exerted by the travel surface on the right front wheel 24a. An illustrative embodiment torsion bar is disclosed in U.S. patent application Ser. No. 11/340,301, filed Jan. 26, 2006, which is expressly incorporated by reference herein.

For simplicity, only right front brake assembly 199 is shown in FIGS. 22 and 23, however a similar brake assembly may be used for each wheel 24 of ATV 10. Front brake assembly 199 is coupled to inner hub 25 of wheel 24. Front axle 206 is supported by inner hub assembly 25. As detailed above, upper control arms 210, lower control arms 212, and steering arms 208 couple to inner hubs 25 of wheels 24a. Steering arm 208 is positioned above and rearward of front axle 206 to allow caliper bracket 201 and caliper 200 to be positioned rearward or on the back side of front axle 206. Control arm 210 is positioned above steering arm 208 to facilitate the relative positioning of steering arm 208 and hence, caliper bracket 201 and caliper 200. Caliper bracket 201 and brake disc 202 are also coupled to inner hub 25 of wheel 24. Brake caliper 200 is coupled to the back or rearward facing end of caliper bracket 201. The placement of brake caliper 200 on the rearward facing end of caliper bracket 201 prevents mud and debris from piling up on top of caliper 200 as tire 22 rotates forward or counterclockwise. Placement of caliper 201 on the frontward facing side or end of brake disc 202 may require a wiper or housing to prevent mud and debris from tire 22 from piling up on caliper 200.

Figure 25:
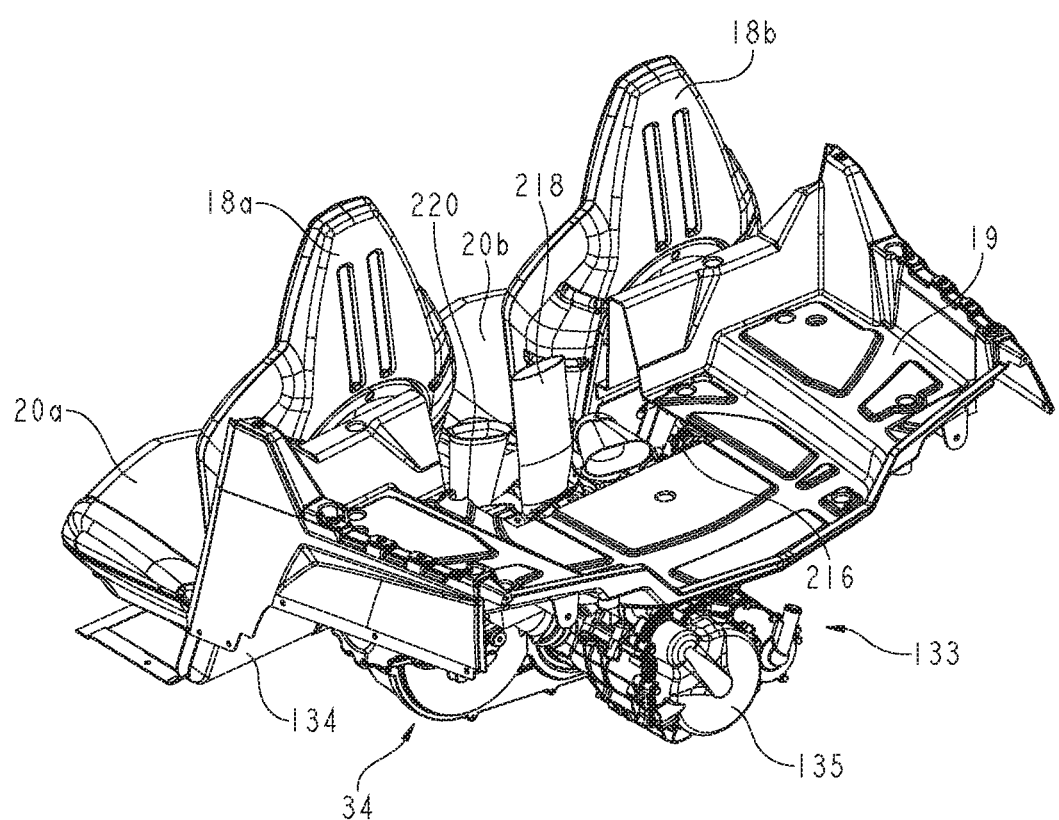
FIG. 25 is an elevated rear perspective view of the engine and clutch cooling components of the side-by-side ATV shown in FIGS. 1 through 4.
Figure 26:
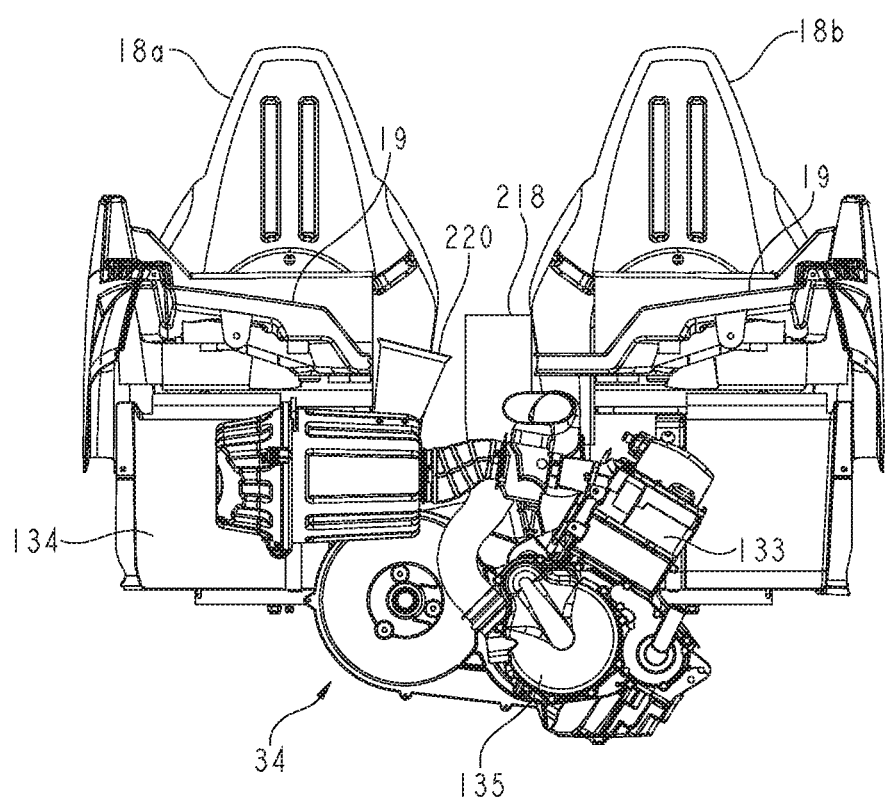
FIG. 26 is a partial rear view of the engine and clutch cooling components shown in FIG. 25.

Referring now to FIGS. 25 and 26, an elevated perspective view and a rear profile view of engine cover 19 of ATV 10 is shown. Modular engine assembly 34 includes engine cooling intake 220 and clutch cooling intake 218. Intakes 218 and 220 extend upward through opening 216 in engine cover 19 and direct cooling air to clutch housing 135 and engine 133. Clutch housing 135 protects a clutch mechanism adapted to transmit power from engine 133 to transmission 136. Intakes 218 and 220 are positioned between driver and passenger upper seating surfaces 18 to collect air passing between upper seating surfaces 18a and 18b when ATV is driven in the forward direction. As ATV 10 increases in speed, more air passes between upper seating surfaces 18a and 18b and is collected by intakes 218 and 220.

Figure 27:
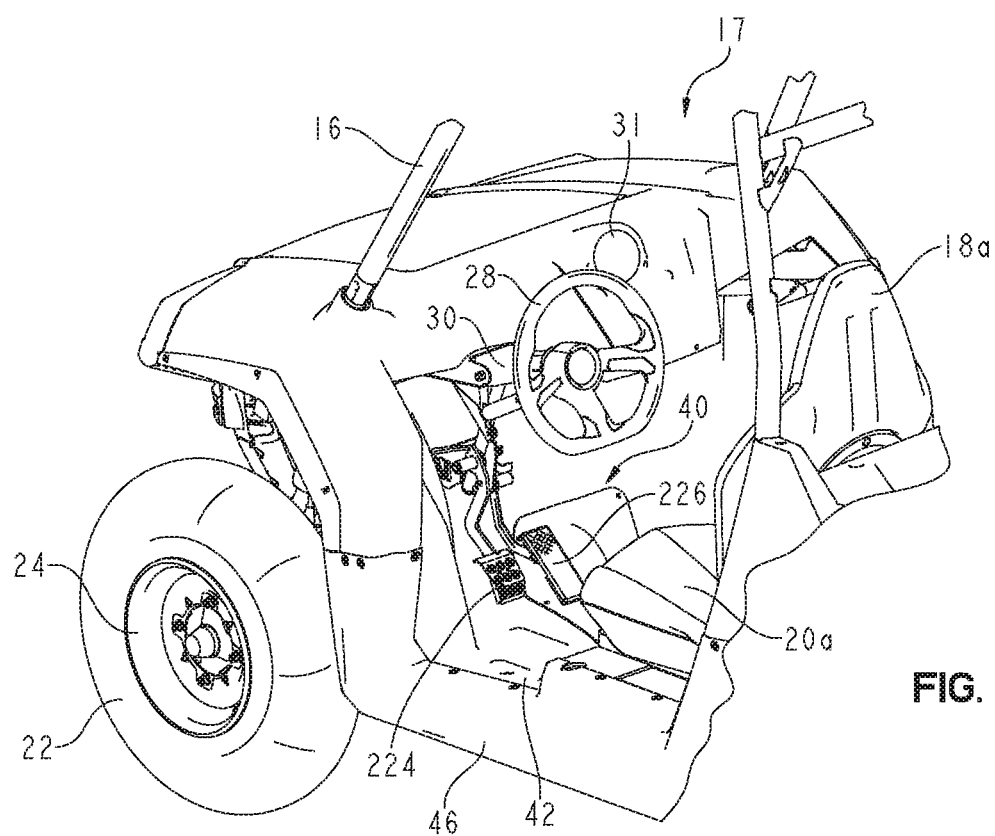
FIG. 27 is a partial perspective view of the driver's side foot well area of the ATV shown in FIGS. 1 through 4.

Referring now to FIG. 27, a partial perspective view of the driver's side of cab 17 of ATV 10 is shown. As described above, cab 17 includes upper seating surface 18, lower seating surface 20, steering wheel 28 and front console 31. In this illustrative embodiment, accelerator 226 and brake pedal 224 are positioned in footwell 40 of cab 17.

Figure 28:
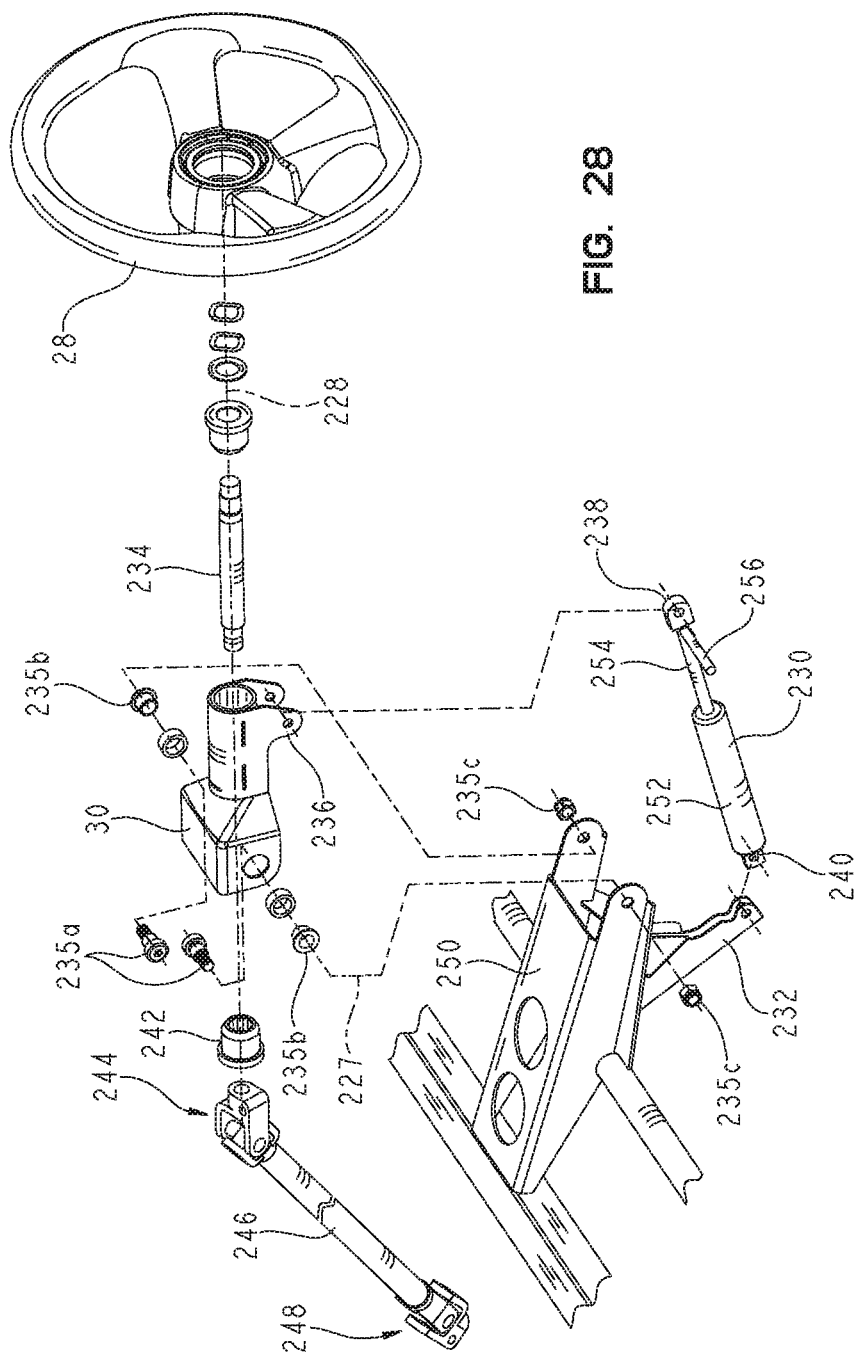
FIG. 28 is an partial exploded view of a steering assembly that may be used on an ATV such as the side-by-side ATV shown in FIGS. 1 through 4.
Figure 29:
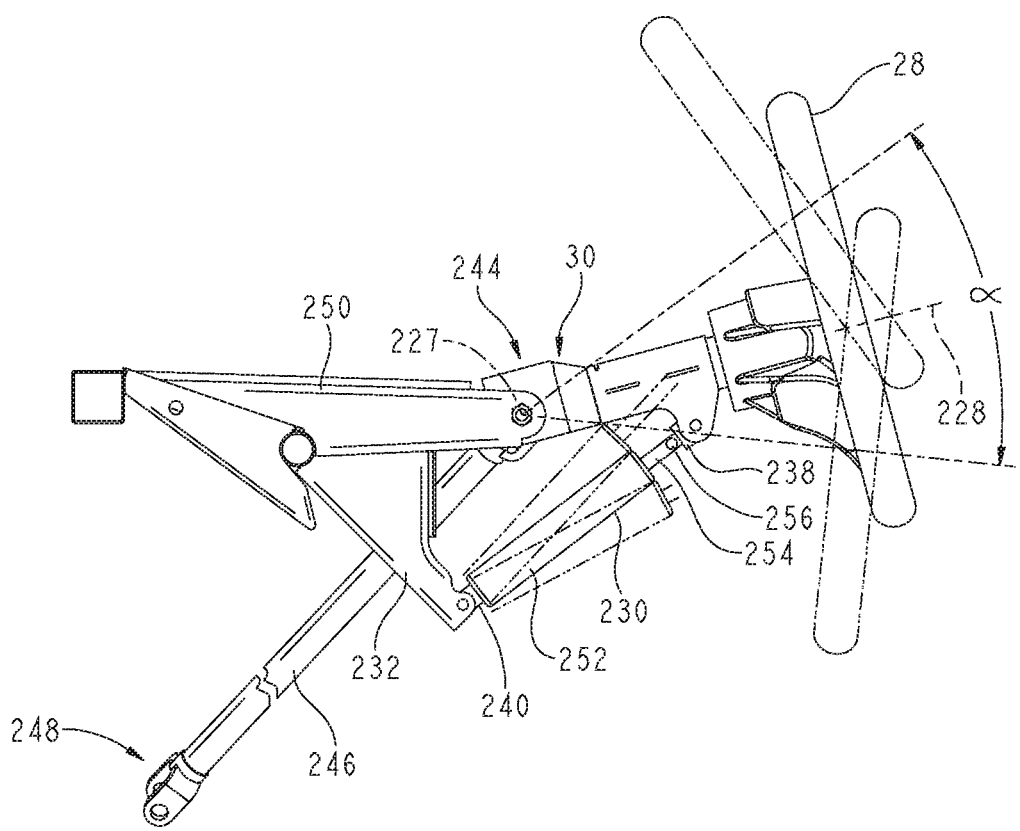
FIG. 29 is a side elevational view of the steering assembly of FIG. 28, showing the steering wheel in various tilted positions.

Referring now to FIG. 28, an exploded view of a steering assembly that may be used on an ATV such as ATV 10 is shown. In this illustrative embodiment, steering wheel 28 may be tilted by pivoting about a pivot axis 227, as shown in FIG. 29. Illustratively, steering wheel 28 may be infinitely adjusted, i.e. in a continuous manner, throughout a predefined angular range of motion a. In the illustrated embodiment, a is defined to be approximately 42 degrees. In a further illustrative embodiment, steering wheel 28 may be adjusted telescopically in a direction along a longitudinal axis 228.

Steering wheel 28 is coupled to rod 234 which extends through tilt bracket 30. Rod 234 is connected to coupler 242 which translates rotation of steering wheel 28 and rod 234 to universal joint 244. Universal joint 244 is coupled to an upper end of steering shaft 246. The lower end of steering shaft 246 is coupled to universal joint 248 which translates the rotation of steering shaft 246 to a front gearbox assembly 247 and steering arms 208 (FIG. 22) to turn front wheels 24. Tilt bracket 30 is pivotally coupled to bracket 250 by a fastener assembly 235, defining pivot axis 227. Fastener assembly 235 may include conventional bolts 235a, washers 235b, and nuts 235c. Bracket 250 includes lower arm 232. Lower end or mount 240 of adjustment device 230 is coupled to arm 232 of bracket 250. Upper end or mount 238 of adjustment device 230 is coupled to tabs 236 of tilt bracket 30. When steering wheel 28 is tilted upward, adjustment device 230 is extended and tilt bracket 30 is rotated upward. Conversely, when steering wheel 28 is tilted downward, adjustment device 230 is retracted and tilt bracket 30 is rotated downward.

In the illustrated embodiment, adjustment device 230 comprises a gas spring having a cylinder 252 and a movable piston rod 254. A lever 256 is operably coupled to the piston rod 254 and is configured to selectively block fluid flow within the cylinder 252. In operation, the lever 256 is in a rest position when it blocks fluid flow and locks the rod 254, and hence steering wheel 28, in position. Activation of the lever 256 permits fluid flow within the cylinder 252 and thus adjustment of the rod 254, and steering wheel 28. In one illustrative embodiment, adjustment device 230 comprises a Bloc-O-Lift® gas spring available from Stabilus.

Figure 30:
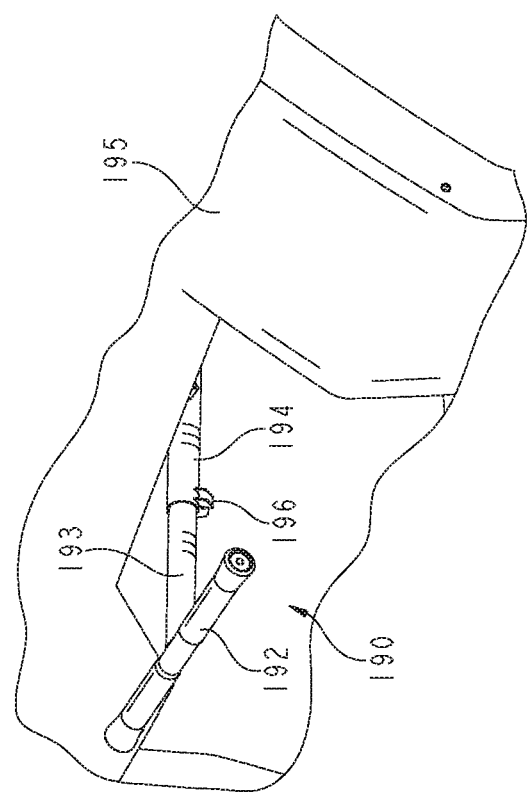
FIG. 30 is a partial perspective view of an adjustable grab bar that may be used on an ATV such as the side-by-side ATV shown in FIGS. 1 through 4.

Referring now to FIG. 30, an adjustable grab bar for a passenger riding in ATV 10 is shown. Adjustable grab bar 190, also shown in FIGS. 22 and 23, is positioned in front dash panel 195 of ATV 10 and extends rearward toward a passenger seated in cab 17. Adjustable grab bar 190 includes handle portion 192, tubes 193 and 194, and locking mechanism 196. The passenger may telescopically adjust the position of handle portion 192. Tube 193 may be extended out of and retracted within tube 194 to allow the passenger to adjust the position of handle portion 192 during ingress or egress from cab 17 of ATV 10. Locking mechanism 196 secures tube 193 and handle portion 192 in the desired position.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An all-terrain vehicle including:
a pair of front wheels;
a pair of rear wheels spaced-apart from the pair of front wheels by a wheelbase distance,
a frame supported by the pair of front wheels and the pair of rear wheels;
a pair of laterally spaced-apart seating surfaces supported by the frame between the pair of front wheels and the pair of rear wheels, the laterally spaced-apart seating surfaces including a driver seating surface positioned on a driver side of a longitudinal center line of the all-terrain vehicle and a passenger seating surface positioned on a passenger side of the longitudinal center line of the all-terrain vehicle;
a drivetrain assembly comprising:
an engine positioned rearward of the laterally spaced-apart seating surfaces;
a continuously variable transmission operatively coupled to the engine and positioned rearward of the laterally spaced-apart seating surfaces; and
a differential operatively coupled to the engine through the continuously variable transmission; and
a three position mounting system which mounts the drivetrain assembly to the frame, the three point mounting system includes a first mount positioned on the driver side of the longitudinal center line of the all-terrain vehicle, a second mount positioned on a passenger side of the longitudinal center line of the all-terrain vehicle, and a third mount positioned rearward of the first mount and the second mount;
the first mount and the second mount positioned on the lower side of the drivetrain assembly proximate the engine of the drivetrain assembly and the third mount is positioned on an upper side of the drivetrain assembly proximate the differential of the drivetrain assembly.

2. The all-terrain vehicle of claim 1, wherein the first mount and the second mount support the drivetrain assembly relative to the frame and the third mount suspends the drivetrain assembly from the frame.

3. The all-terrain vehicle of claim 1, wherein the first mount includes a first bracket supported by the frame, a second bracket mounted to the drivetrain assembly, and a first fastener extending in a lateral direction of the all-terrain vehicle, the first fastener being received in a first aperture in one of the first bracket and the second bracket.

4. The all-terrain vehicle of claim 3, wherein the second mount includes a third bracket supported by the frame, a fourth bracket mounted to the drivetrain assembly, and a second fastener extending in the lateral direction of the all-terrain vehicle, the second fastener being received in a second aperture in one of the third bracket and the fourth bracket.

5. The all-terrain vehicle of claim 4, wherein the third mount is coupled to the drivetrain assembly on a first side of the differential facing a first wheel of the rear pair of wheels and on a second side of the differential facing a second wheel of the rear pair of wheels.

6. The all-terrain vehicle of claim 1, wherein the second mount includes a first bracket supported by the frame, a second bracket mounted to the drivetrain assembly, and a first fastener extending in the lateral direction of the all-terrain vehicle, the first fastener being received in a first aperture in one of the first bracket and the second bracket.

7. The all-terrain vehicle of claim 1, wherein the third mount is coupled to the drivetrain assembly on a first side of the differential facing a first wheel of the rear pair of wheels and on a second side of the differential facing a second wheel of the rear pair of wheels.

8. The all-terrain vehicle of claim 1, wherein the first mount includes a first bracket supported by the frame and having a first aperture, a second bracket mounted to the drivetrain assembly and having a second aperture, a first mounting plate including a third aperture and a fourth aperture, a first fastener being received by the first aperture of the first bracket and the third aperture of the first mounting plate, and a second fastener being received by the second aperture of the second bracket and the fourth aperture of the first mounting plate.

9. The all-terrain vehicle of claim 8, wherein the second mount includes a third bracket supported by the frame and having a fifth aperture, a fourth bracket mounted to the drivetrain assembly and having a sixth aperture, a second mounting plate including a seventh aperture and an eighth aperture, a third fastener being received by the fifth aperture of the third bracket and the seventh aperture of the second mounting plate, and a fourth fastener being received by the sixth aperture of the fourth bracket and the eighth aperture of the second mounting plate.

10. The all-terrain vehicle of claim 9, wherein the third mount includes a fifth bracket coupled to the frame, a sixth bracket coupled to the drivetrain assembly on a first side of the differential facing a first wheel of the rear pair of wheels, and a seventh bracket coupled to the drivetrain assembly on a second side of the differential facing a second wheel of the rear pair of wheels, the sixth bracket and the seventh bracket coupled to the fifth bracket through a plurality of fasteners.

11. The all-terrain vehicle of claim 10, wherein each of the first fastener, the second fastener, the third fastener, the fourth fastener, and the plurality of fasteners have a longitudinal axis extending in a lateral direction of the all-terrain vehicle.

12. The all-terrain vehicle of claim 1, wherein the third mount is laterally between the first mount and the second mount.

13. The all-terrain vehicle of claim 1, wherein the first mount and the second mount are positioned on a lower side of the drivetrain assembly proximate the engine of the drivetrain assembly and the third mount is positioned proximate the differential of the drive train assembly.

14. The all-terrain vehicle of claim 13, wherein the first mount and the second mount support the drivetrain assembly relative to the frame and the third mount suspends the drivetrain assembly from the frame.

15. An all-terrain vehicle including:
a pair of front wheels;
a pair of rear wheels spaced-apart from the pair of front wheels by a wheelbase distance,
a frame supported by the pair of front wheels and the pair of rear wheels;
a pair of laterally spaced-apart seating surfaces supported by the frame between the pair of front wheels and the pair of rear wheels, the laterally spaced-apart seating surfaces including a driver seating surface positioned on a driver side of a longitudinal center line of the all-terrain vehicle and a passenger seating surface positioned on a passenger side of the longitudinal center line of the all-terrain vehicle;
a drivetrain assembly comprising:
an engine positioned rearward of the laterally spaced-apart seating surfaces;
a continuously variable transmission operatively coupled to the engine and positioned rearward of the laterally spaced-apart seating surfaces; and
a differential operatively coupled to the engine through the continuously variable transmission;
a three position mounting system which mounts the drivetrain assembly to the frame, the three point mounting system includes a first mount and a second mount located longitudinally forward of a third mount; and
the third mount is coupled to the drivetrain assembly on a first side of the differential facing a first wheel of the rear pair of wheels and on a second side of the differential facing a second wheel of the rear pair of wheels.

16. The all-terrain vehicle of claim 15, wherein the first mount and the second mount are positioned on a lower side of the drivetrain assembly and the third mount is positioned on an upper side of the drive train assembly.

17. The all-terrain vehicle of claim 15, wherein the first mount and second mount are positioned vertically lower than the third mount.

18. An all-terrain vehicle including:
a pair of front wheels;
a pair of rear wheels spaced-apart from the pair of front wheels by a wheelbase distance,
a frame supported by the pair of front wheels and the pair of rear wheels;
a pair of laterally spaced-apart seating surfaces supported by the frame between the pair of front wheels and the pair of rear wheels, the laterally spaced-apart seating surfaces including a driver seating surface positioned on a driver side of a longitudinal center line of the all-terrain vehicle and a passenger seating surface positioned on a passenger side of the longitudinal center line of the all-terrain vehicle;
a drivetrain assembly comprising:
an engine positioned rearward of the laterally spaced-apart seating surfaces;
a continuously variable transmission operatively coupled to the engine and positioned rearward of the laterally spaced-apart seating surfaces; and
a differential operatively coupled to the engine through the continuously variable transmission;
a three position mounting system which mounts the drivetrain assembly to the frame, the three point mounting system includes a first mount and a second mount located longitudinally forward of a third mount; and
the first mound and the second mount positioned on a lower side of the drivetrain assembly proximate the engine of the drivetrain assembly and the third mount is positioned on an upper side of the drivetrain assembly proximate the differential of the drive train assembly.

19. The all-terrain vehicle of claim 18, wherein the first mount includes a first bracket supported by the frame and having a first aperture, a second bracket mounted to the drivetrain assembly and having a second aperture, a first mounting plate including a third aperture and a fourth aperture, a first fastener being received by the first aperture of the first bracket and the third aperture of the first mounting plate, and a second fastener being received by the second aperture of the second bracket and the fourth aperture of the first mounting plate.

20. The all-terrain vehicle of claim 19, wherein the second mount includes a third bracket supported by the frame and having a fifth aperture, a fourth bracket mounted to the drivetrain assembly and having a sixth aperture, a second mounting plate including a seventh aperture and an eighth aperture, a third fastener being received by the fifth aperture of the third bracket and the seventh aperture of the second mounting plate, and a fourth fastener being received by the sixth aperture of the fourth bracket and the eighth aperture of the second mounting plate.

21. The all-terrain vehicle of claim 20, wherein the third mount includes a fifth bracket coupled to the frame, a sixth bracket coupled to the drivetrain assembly on a first side of the differential facing a first wheel of the rear pair of wheels, and a seventh bracket coupled to the drivetrain assembly on a second side of the differential facing a second wheel of the rear pair of wheels, the sixth bracket and the seventh bracket coupled to the fifth bracket through a plurality of fasteners.

22. The all-terrain vehicle of claim 21, wherein each of the first fastener, the second fastener, the third fastener, the fourth fastener, and the plurality of fasteners have a longitudinal axis extending in a lateral direction of the all-terrain vehicle.

* * * * *